(12) United States Patent
Kimmitt

(10) Patent No.: US 6,738,935 B1
(45) Date of Patent: May 18, 2004

(54) CODING SUBLAYER FOR MULTI-CHANNEL MEDIA WITH ERROR CORRECTION

(75) Inventor: Myles Kimmitt, Shrewsbury, MA (US)

(73) Assignee: 3Com Corporation, Santa Clara, CA (US)

( * ) Notice: Subject to any disclaimer, the term of this patent is extended or adjusted under 35 U.S.C. 154(b) by 610 days.

(21) Appl. No.: 09/626,275

(22) Filed: Jul. 25, 2000

Related U.S. Application Data

(60) Provisional application No. 60/180,665, filed on Feb. 7, 2000.

(51) Int. Cl.[7] .................................................. G06F 11/00
(52) U.S. Cl. ........................ 714/701; 375/253; 370/464
(58) Field of Search .......................... 714/701; 375/253; 370/464

(56) References Cited

U.S. PATENT DOCUMENTS

| | | | |
|---|---|---|---|
| 3,735,363 A | * | 5/1973 | Beers et al. ............. 340/172.5 |
| 3,745,531 A | * | 7/1973 | Staas, Jr. ................ 340/172.5 |
| 3,920,894 A | * | 11/1975 | Shirley et al. ................ 178/22 |
| 4,127,845 A | * | 11/1978 | Dansbach et al. .......... 340/151 |
| 4,335,458 A | * | 6/1982 | Krol ............................ 371/38 |
| 4,348,742 A | * | 9/1982 | O'Brien ...................... 364/900 |
| 4,398,292 A | * | 8/1983 | Doi et al. ..................... 371/39 |

(List continued on next page.)

OTHER PUBLICATIONS

IEEE 802.3 HSSG, Index of Presentations, Nov. 1999, located at http://.grouper.ieee.org/gropus/802/3/10G_study/public/nov99/index.html.

(List continued on next page.)

*Primary Examiner*—Albert Decady
*Assistant Examiner*—Dipakkumar Gandhi
(74) *Attorney, Agent, or Firm*—Weingarten, Schurgin, Gagnebin & Lebovici LLP

(57) ABSTRACT

A method and apparatus for encoding and decoding data. A primary data channel comprising a parallel data word has a bit of a secondary data channel associated with the parallel data word. ECC bits are generated based upon the parallel data word and the monitor bit and the ECC bits are appended to the data comprising the primary and secondary channel data to form an extended width parallel word. The extended width parallel data word is divided into a plurality of lesser width data words which are each scrambled using respective side scrambler for form respective cipher data words. An ECC control bit and a parity bit is generated for each channel, and associated with the cipher data words to form extended cipher data words. The cipher data words are serialized and transmitted over a serial link. The received serial data is deserialized, word framed and word aligned across the respective channels, and descrambled to obtain the data contained in the primary and secondary data channels. ECC is provided both on data and control bits to permit error correction on either the data or control information.

14 Claims, 15 Drawing Sheets

U.S. PATENT DOCUMENTS

| | | | |
|---|---|---|---|
| 4,402,045 A | * 8/1983 | Krol | 364/200 |
| 4,486,739 A | 12/1984 | Franaszek et al. | 340/347 |
| 4,593,393 A | 6/1986 | Mead et al. | 371/37 |
| 4,598,404 A | * 7/1986 | Perry et al. | 371/49 |
| 4,651,321 A | * 3/1987 | Woffinden et al. | 371/38 |
| 4,688,250 A | * 8/1987 | Corrington et al. | 380/23 |
| 4,930,127 A | * 5/1990 | Abaziou et al. | 370/110.4 |
| 5,124,980 A | * 6/1992 | Maki | 370/77 |
| 5,157,671 A | * 10/1992 | Karplus | 371/43 |
| 5,340,964 A | * 8/1994 | Galloway et al. | 219/486 |
| 5,450,398 A | * 9/1995 | Abefelt et al. | 370/60.1 |
| 5,508,713 A | * 4/1996 | Okouchi | 345/1 |
| 5,570,356 A | * 10/1996 | Finney et al. | 370/85.9 |
| 5,838,698 A | * 11/1998 | Doubler et al. | 371/49.1 |
| 6,044,482 A | * 3/2000 | Wong | 714/758 |
| 6,075,513 A | * 6/2000 | Reddy et al. | 345/112 |
| 6,154,797 A | * 11/2000 | Burns et al. | 710/52 |

OTHER PUBLICATIONS

Common PMD Interface "Hari", Nov. 1999, located at http://grouper.ieee.org/gropus/802/3/10G_study/public-.nov99.

Hari Coding Objective, Nov. 1999, located at http://grouper.ieee.org/gropus/802/3/10G_study/public/nov99.

IEEE Draft P802.3ab/D6.0; Supplemenl to: Carrier Sense Multiple Access with Collision Detection (CSMA/CD) Access Method and Physical Layer Specification: Physical Layer Parameters and Specifications for 1000 Mb/s Operation over 4 pair of Category 5 Balanced Copper Cabling, Type 1000BASE–T; Mar. 25, 1999.

* cited by examiner

CODING SUBLAYER FOR MULTI-CHANNEL MEDIA WITH ERROR CORRECTION

CROSS REFERENCE TO RELATED APPLICATIONS

This application claims the benefit under 35 U.S.C. §119 (e) of provisional patent application no. 60/180,665, filed Feb. 7, 2000 and entitled CODING SUBLAYER FOR MULTI-CHANNEL MEDIA WITH ERROR CORRECTION.

STATEMENT REGARDING FEDERALLY SPONSORED RESEARCH OR DEVELOPMENT

Not Applicable

BACKGROUND OF THE INVENTION

The present invention relates generally to data encoding and more specifically, to physical coding and decoding techniques for segregating and reliably communicating data over a plurality of serial channels.

In recent years there has been an increasing desire to produce electronic products which operate at ever increasing speeds. Of particular note in this regard are telecommunications devices such as routers, bridges and switches. While typical communication line rates for such devices were 10 megabits per second (mbps) for Ethernet transmissions less than a decade ago, 100 mbps Ethernet line rates have now become commonplace. Moreover, devices are currently being deployed which support ten gigabit per second (gbps) Ethernet line rates.

Data is typically received at an input port of a telecommunications device over a high speed serial communications link. Received data is converted to a parallel word format in accordance with a specified media access control (MAC) protocol for processing within the device. The width of the parallel data output from the MAC protocol is typically specified for the respective MAC protocol. A 10 gigabit per second Ethernet protocol has been described having a MAC output using a 64 bit wide data word. At such high data rates, the transport of data within the device can be problematic.

While data can be transported through the device as a parallel word to achieve workable clock rates, such is undesirable for a number of reasons. First, wide bus widths consume substantial space on the printed circuit boards for the numerous conductive paths which are required. Second, passing large numbers of conductive signals through backplanes requires large numbers of connector contacts as well as drivers and receivers. Often, it is undesirable to provide for the large number of connector contacts that are required to accommodate a 64 bit wide or greater width parallel bus. Additionally, it is recognized that interconnections through backplane connectors contribute to system unreliability and for this reason as well it is preferable to minimize the number of signal paths through backplanes and connectors. Finally, numerous integrated circuits are required in terms of drivers and receivers to interface to wide parallel buses.

In order to minimize the number of printed circuit board runs and backplane connections, parallel data has been segregated into narrower parallel data words and the respective words have been serialized for transmission over a plurality of serial channels. This technique can result in the introduction of near end and far end crosstalk in adjacent channels that can introduce data errors in the transmission. Furthermore, complex techniques and/or substantial overhead in terms of signal bandwidth and circuitry have typically been necessary to accomplish synchronization and/or framing in such systems.

Moreover, it is desirable to be able for the receive logic to be able to acquire synchronization of serially transmitted data "blind"; i.e. without the use of additional synchronization signal lines since the transport of separate synchronization signals also adds to the number of printed circuit board runs and connector contacts that are needed.

It would therefore be desirable to have a data coding, decoding and transport technique which allows the transmission of data reliably through a telecommunications device without employing wide parallel buses and which permits blind acquisition of synchronization at the receiver and reassembly of the transmitted data words.

BRIEF SUMMARY OF THE INVENTION

In accordance with the present invention, a method and apparatus for transporting data reliably over a plurality of serial channels is disclosed. Physical coding sublayer logic receives a parallel data word from a system interface. The parallel data word includes data of a first data channel and a monitor channel. The monitor channel is employed to convey supervisory or other information in a second data channel that is independent of the data conveyed in the first data channel. A monitor channel and the parallel data data word are applied to an error correction code generator and a error correction code (ECC) is generated. The parallel data word is divided into a plurality of lesser width data words. Selected bits of the ECC code and the monitor channel are appended to the lesser width parallel data words in a predetermined manner to form a plurality of extended lesser width parallel data words corresponding in number to the number of lesser width parallel data words. The extended lesser width parallel data words are serialized in respective serializers and transmitted over a plurality of serial data links.

Each serial channel also includes two parity bits. The first parity bit is employed for error detection and correction and additionally carries control state information. The parity bits are generated such that proper parity is indicated if the XOR sum of all bits within a channel (including the first and second parity bits) equals 1. This property is used to obtain proper word framing at receive logic within the physical coding sublayer. The second parity bit in each channel is generated such that the XOR sum of all of the second parity bits equals 0 when the channels are properly aligned. Proper word framing and alignment is verified by testing framing and alignment over a predetermined number of word samples.

BRIEF DESCRIPTION OF THE SEVERAL VIEWS OF THE DRAWINGS

The invention will be more fully understood by reference to the following Detailed Description of the Invention in conjunction with the Drawing of which.

DETAILED DESCRIPTION OF THE INVENTION

Provisional patent application no. 60/180,665, filed Feb. 7, 2000 and entitled CODING SUBLAYER FOR MULTI-CHANNEL MEDIA WITH ERROR CORRECTION is hereby incorporated by reference.

Figure 1:
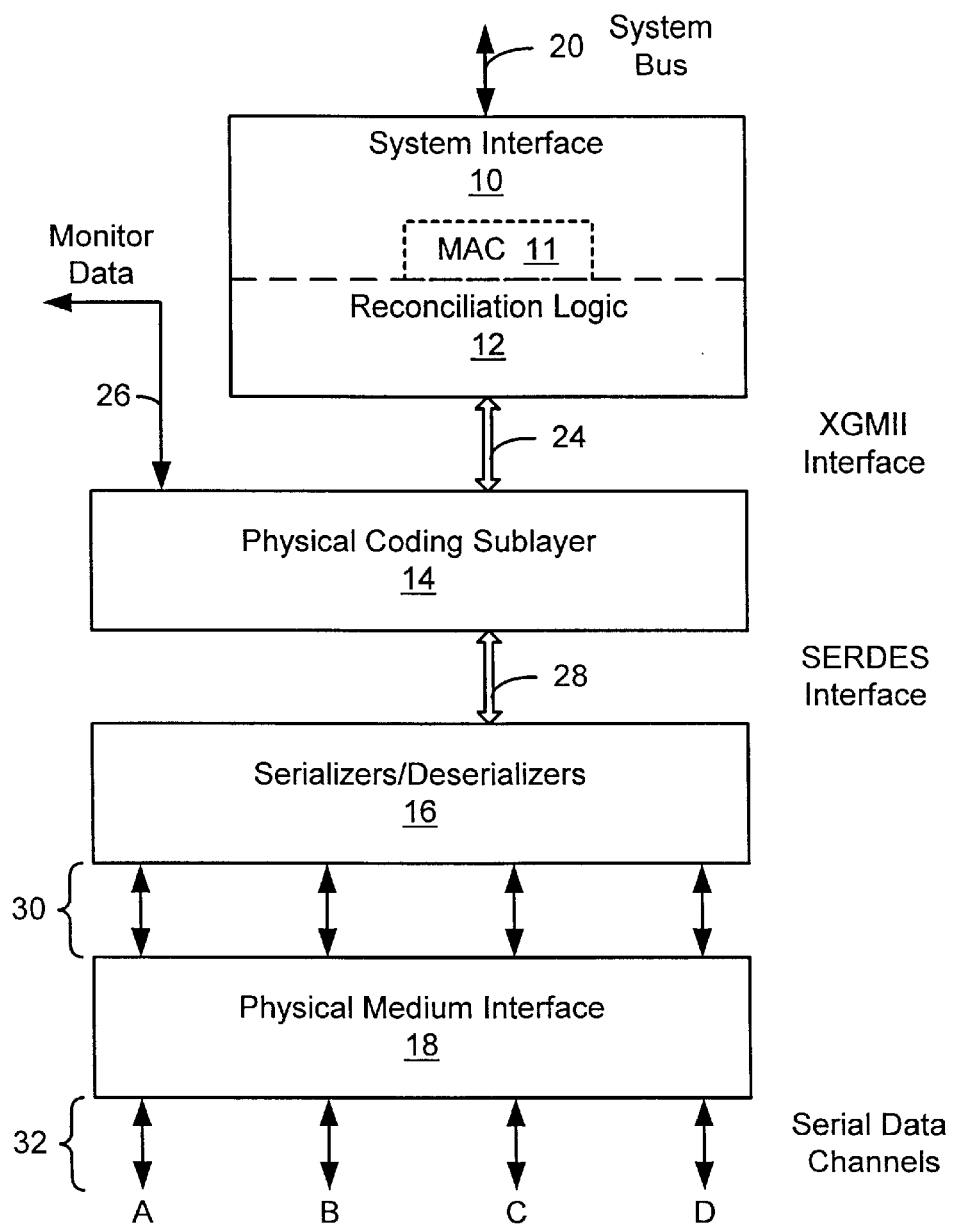
FIG. 1 is a block diagram illustrating physical coding sublayer logic within a system operative in accordance with the present invention.

In accordance with the present invention a system is disclosed, along with a physical coding sublayer employed within the system, for communication of data presented in parallel form across multiple serial channels in short haul copper links (such as backplanes and short cable connections), parallel fiber optic links, and wave division multiplexing (WDM) applications (employing fiber optic media). An exemplary system incorporating the presently disclosed physical coding sublayer is illustrated in FIG. 1. Referring to FIG. 1, the system includes an optional system interface 10 that may include a media access control (MAC) interface 11, reconciliation logic 12, physical coding sublayer logic 14, serializers/deserializers 16 and a physical medium interface 18. The system provides for bidirectional signal transmission and includes a transmit path in which data moves from the system interface downward through the various blocks as depicted in FIG. 1 for transmission over a plurality of serial data channels (denoted as Channels A–D). The system also includes a receive path in which data moves from the serial data channels A–D upward as depicted in FIG. 1 through the respective logical blocks. In the illustrated embodiment, along the transmit path information received over a system bus 20 is converted to media access format within the system interface 10 by the Media Access Control logic MAC 11 in accordance with a known MAC protocol such as the ten gigabit Ethernet protocol. The media access control logic is coupled to the reconciliation logic 12. The reconciliation logic 12 converts the MAC output to a form that generally comports with the well known XGMII interface 24. The media access interface may be the same as the XGMII interface in which case the reconciliation logic 12 may be omitted. The XGMII interface is coupled to the physical coding sublayer logic 14. A monitor bit from a monitor channel 26 is also coupled to the physical coding sublayer logic 14. The information conveyed in the monitor channel is independent of the primary data channel. In the illustrative embodiment, the monitor channel is a 156.25 MB/s full duplex channel and can be employed for the transmission of any control information, management information or data. The physical coding sublayer logic 14 is operative to (a) receive the monitor channel bit from the monitor channel 26, (b) generate an error correction code as a function of parallel data received over the XGMII interface 24 and the monitor channel 26 bit, (c) subdivide the received parallel data word, the monitor channel bit and an ECC code generated based upon the monitor bit and the parallel data word into a plurality of lesser width parallel data words, (d) scramble the bits within each of the plurality of lesser width parallel data words using a side-stream scrambler to form cipher data words that are decorrelated in time, (e) generate a control error correction code (CECC) bit that is appended to each of the cipher data words and (f) generate a parity code that is associated with each of the cipher data words and employed in the process of interchannel alignment. The parity bit and the CECC bit together with the scrambled data form an extended width cipher data word. The extended width cipher data words are coupled to serializers within the serializers/deserializers 16 via a serializer/deserializer (SERDES) interface 28. The serializers convert the extended width cipher data words from parallel to serial form. The serialized extended width cipher data words are coupled to the physical medium interface 18 over respective serial links 30. The physical medium interface drives the respective channels in accordance with the required drive characteristics. More specifically, the physical medium interface 18 provides the appropriate electrical or electro-optical interface to copper or fiber serial data links 32, as applicable. By subdividing the wide parallel data word into a plurality of narrower parallel data words, encoding the narrower parallel data words and transmitting data contained in the plurality of narrower encoded parallel data words serially over a corresponding plurality data of serial channels, the number of printed circuit board runs or fiber transmission channels are significantly reduced and an extremely low bit error rate can be achieved. In the case of copper printed circuit board runs, significant space savings on the printed circuit board may be achieved as fewer printed circuit board runs and fewer connector contacts are necessary.

Along the receive path, data moves in the reverse direction from the transmit path. In particular, serialized extended width cipher data words received on serial data channels A–D at the physical medium interface 18 are converted to the logic levels employed by the deserializers 16. The deserializers 16 convert the respective serial extended width cipher data words into parallel extended width cipher data words and the parallel extended width cipher data words are coupled to the physical coding sublayer logic 14 over the SERDES interface 28. The physical coding sublayer logic 14 decodes the cipher data words to recreate the original parallel data word at the XGMII interface 24. The parallel data words are presented to the reconciliation logic 12, which, in the disclosed embodiment, converts the signalling from that employed on the XGMII interface 24 to the internal signalling format employed by the MAC. The system interface 20 supplies data to the system across the system bus. Bus ordering reflects IEEE 802.3 conventions used on the XGMII bus. Within a channel, bit 0 is transmitted on the wire first which is conventional for 1000B-X and Fibre Channel implementations.

On the physical coding sublayer side of the reconciliation logic 12, the reconciliation logic 12 interface generally conforms to the XGMII interface 24. In particular, for the transmit path, the XGMII interface 24 (See FIGS. 1 and 2) includes a parallel data bus TXX_D<63:0>, a control bus TXX_C<7:0> and a clock TXX_CLK. Along the receive path the XGMII interface includes a parallel data bus RXX_D<63:0>, a control bus RXX_C<7:0> and a receive clock RXX_CLK. The signalling on the XGMII bus 24 is conventional. A 64-bit implementation of the XGMII is used although the bus signaling definition is independent of width.

Normal Ethernet packets are transmitted over the XGMII bus. The Ethernet packets may start and stop on any byte boundary and require delimiters, along with a series of control characters used to signal the bus state, such as idle or error. All bus states are transmitted on a per-byte basis and are encoded using the control bit and data byte for that specific byte.

Listed below are the byte states used on the XGMII bus.
Data Valid (DV):
 Used to indicate a valid byte within an Ethernet packet.
Idle (I):
 Used to signal the byte is idle during normal inter-packet gap.
Start of Packet-SOP (S):
 Used to signal the beginning of each packet by replacing the first byte of preamble in an Ethernet packet.
End of Packet-EOP (T):
 Used to signal the end of each packet by asserting for one byte immediately after the last byte of an Ethernet packet.
ERROR (E)
 Used to signal when an error needs to be forced on the TX bus or when an error is detected by the receive PCS.
These XGMII byte states have the specific bit encoding shown below in Table 1.

TABLE 1

XGMII Control Characters

| Byte State | Control Bit (C) | Data Byte (D) | Description |
|---|---|---|---|
| DV | 0 | X | Data Valid |
| I | 1 | b00000111 | Idle |
| SOP (S) | 1 | b11111011 | Start of Packet |
| EOP (T) | 1 | b11111101 | End of Packet |
| Error (E) | 1 | b11111110 | Error |

The XGMII bus contains 64 data bits (D63 . . . D0) in each direction which are divided into eight groups, each of eight bits, or a byte. Each of the bytes are accompanied by a control bit (C7 . . . C0). All the bits are clocked with a source-synchronous clock labeled TXR_CLK. The control bits C7 . . . C0 received as TXR_C<7:0> collectively make up the TXX_C<7:0> bus.

Figure 2:
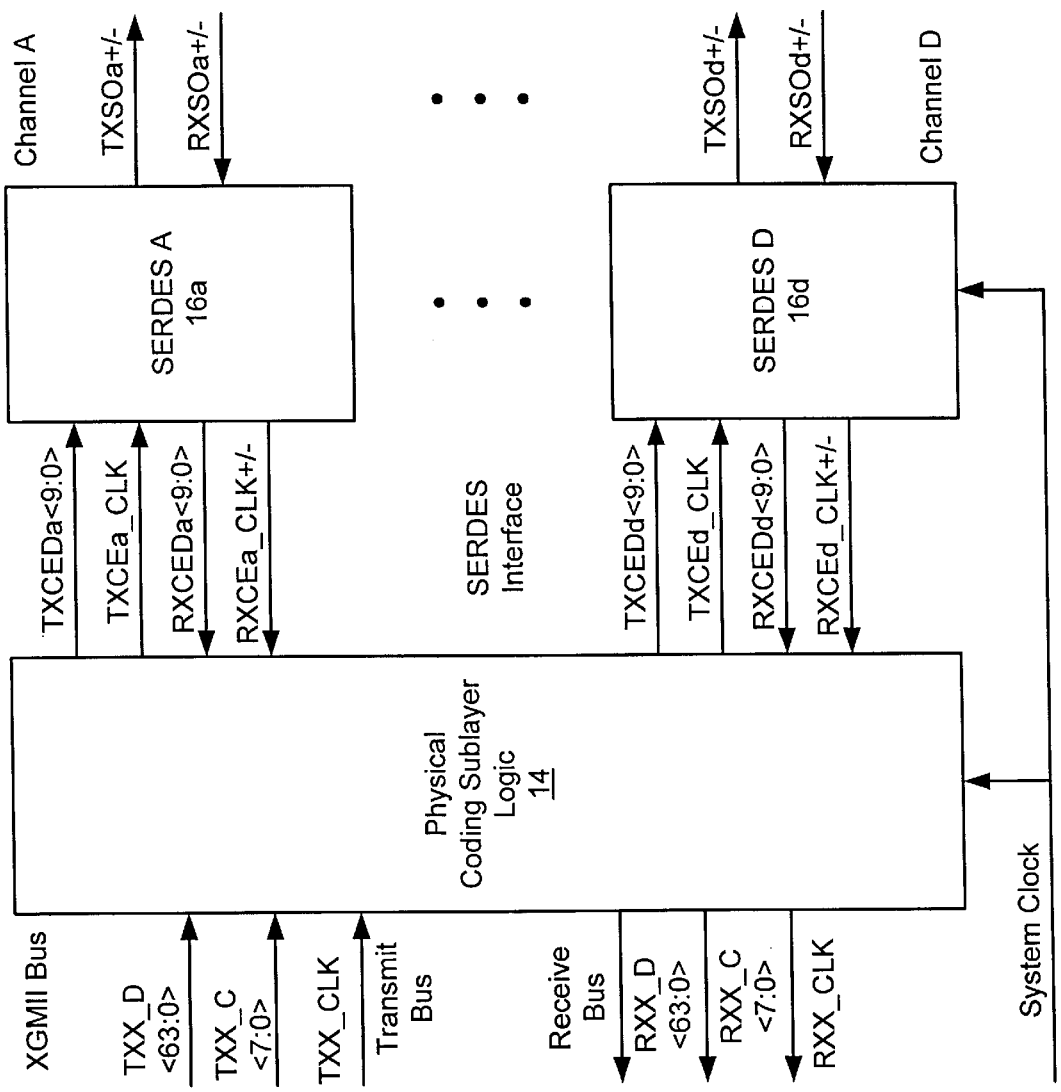
FIG. 2 is a diagram illustrating interfaces for the Physical Coding Sublayer logic and the serializer-deserializer logic depicted in FIG. 1.

The interface to the physical coding sublayer logic 14 and the interfaces for the Serializers/Deserializers 16 are depicted in FIG. 2. On the reconciliation logic 12 side of the physical coding sublayer logic 14, the interface comprises the XGMII interface. The SERDES interface 28 includes signals in the transmit path and signals in the receive path. In the transmit path, the SERDES interface 28 includes a parallel data bus TXCED<9:0> and a transmit clock TXCE_CLK for each of the respective channels. The data buses in the SERDES interface 28 for the respective channels in the transmit path are identified as TXCEDa<9:0>, TXCEDb<9:0>, TXCEDc<9:0> and TXCEDd<9:0> for channels A, B, C and D respectively. Transmit clocks TXCEa_CLK, TXCEb_CLK, TXCEc_CLK and TXCEd_CLK are provided for each of the respective channels.

In the receive path, the SERDES interface includes a parallel data bus RXCED<9:0> and a differential receive clock comprising signals RXCE_CLK+/− for data received over each of the channels A–D. The data buses in the SERDES interface in the receive path are identified as RXCEDa<9:0>, RXCEDb<9:0>, RXCEDc<9:0> and RXCEDd<9:0> for channels A, B, C and D respectively. Differential clocks signals RXCEa_CLK+/−, RXCEb_CLK+/−, RXCEc_CLK+/− and RXCEd_CLK+/− are provided for each channel in the receive path.

The serializers/deserializers 16 include a serializer/deserializer for each channel and are identified as SERDES A 16*a*, SERDES B 16*b*, SERDES C 16*c*, and SERDES D 16*d* respectively. Each SERDES 16*a* through 16*d* is coupled to transmit and receive channels as depicted in FIG. 2. In the disclosed embodiment, the serial data transmitted between the SERDES logic 16 and the Physical Medium Interface 18 is communicated in differential form. Accordingly, differential drivers and receivers are employed within the SERDES logic between the SERDES logic 16 and the Physical Medium Interface 18. For example, SERDES A 16*a* drives differential signals TXSOa+/− along the transmit path and receives differential signals RXSOa+/− along the receive path. The physical coding sublayer 14 and the Serializers/Deserializers 16 also receive a system clock or reference clock as illustrated in FIG. 2. The system clock is used by the Serializer as a low jitter reference clock and by the Deserializer to check the frequency of the received serial data.

Figure 3:
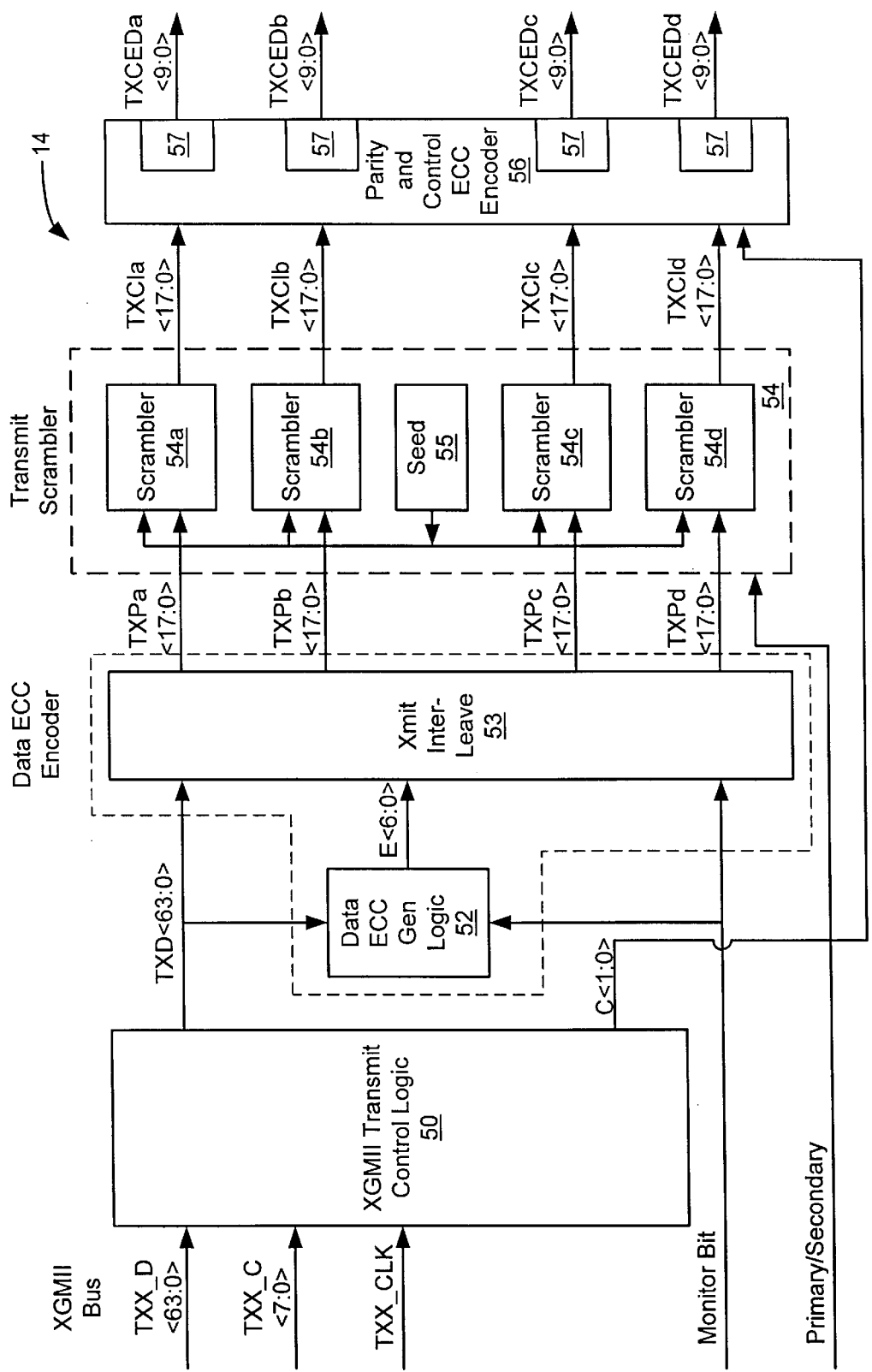
FIG. 3 is a block diagram illustrating transmit logic employed in the physical coding sublayer logic depicted in FIGS. 1 and 2.
Figure 4:
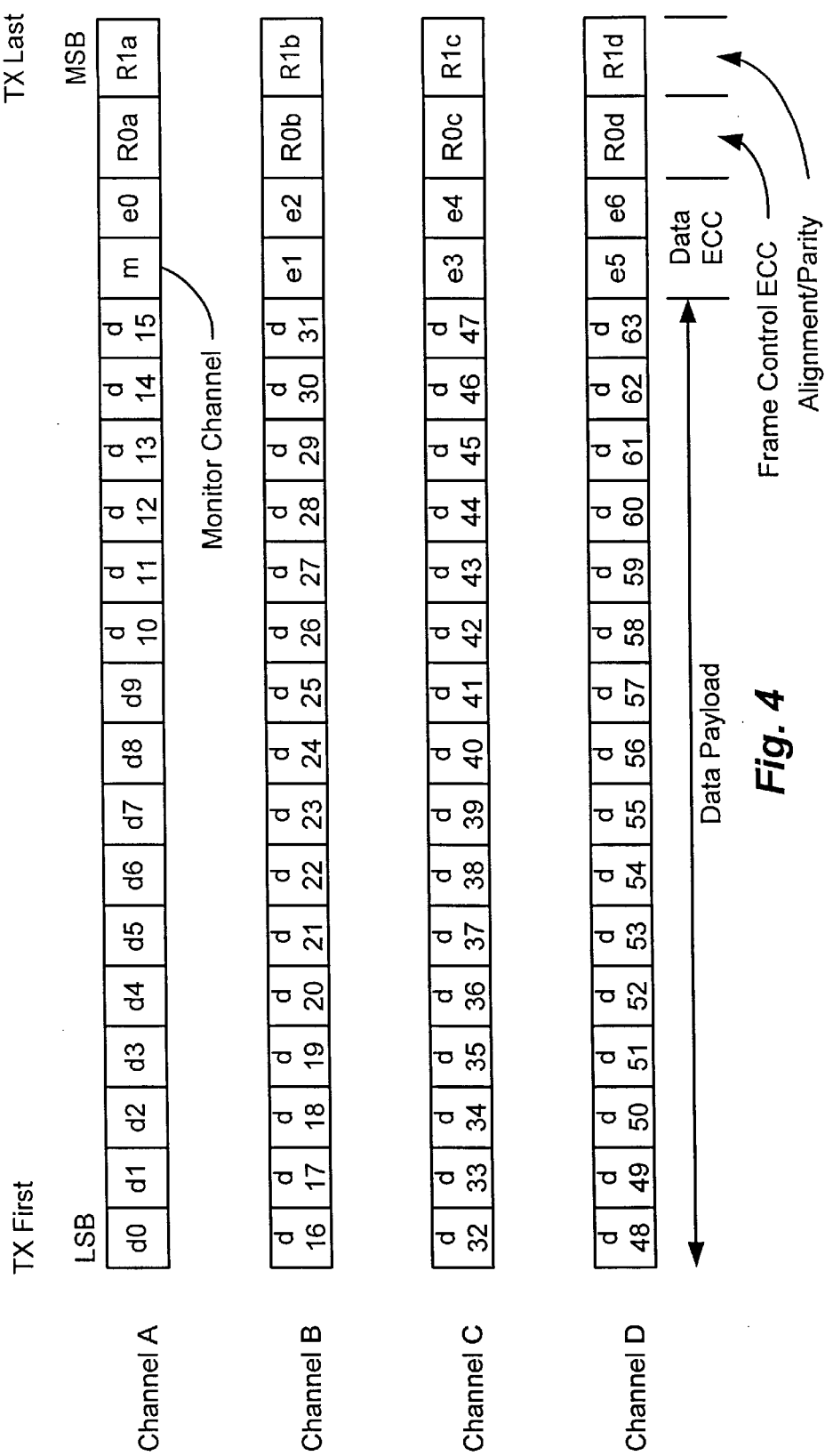
FIG. 4 is a diagram illustrating data ordering for data transmitted from the physical coding sublayer logic over respective serial channels.

Exemplary transmit path logic within the physical coding sublayer logic 14 is depicted in FIG. 3. The use of the presently disclosed physical coding sublayer logic 14 is particularly beneficial in environments where crosstalk and random noise events are present. Redundancy and a high coding strength are built into the coding to provide extremely low bit error rates. Single bit error correction in both the data and control portions of the code are provided.
Transmit Path Operation The transmit path logic within the physical coding sublayer logic 14 comprises several logical functions that collectively provide the desired performance while maintaining a pipelined design required for high-speed transmission and low power. More specifically, the transmit path logic within the physical coding sublayer logic 14 includes an XGMII controller 50, a data error correction code generator 52, an interleave function 53, transmit side-scrambler logic 54, and a Parity and Control ECC encoder 56. All these functions are built into a 4×20-bit cell that carries 64 bits of data and framing compatible with Ethernet and cell applications. The 80-bit cell format comprising four 20 bit channels that are output from the physical coding sublayer logic 14 is illustrated in FIG. 4.
XRMTT Transmit Controller The transmit control block 50 is used to encode XGMII transmit state information into a more compressed format used within the physical coding sublayer logic 14 transfers. A four-state (two bit) control path C<1:0> is defined along with additional fields in the data payload to transfer the XGMII control state information on 64-bit boundaries. This control coding limits the Inter Packet Gap (IPG) to 8 bytes minimum. The XGMII Transmit Controller also generates Transmit Error (TX_ER) in response to XGMII Errors which are then signalled across the link and appear as receive errors at the receive PCS. Transmit Error coding is not required per byte (as defined by XGMII) and needs only to be transmitted on a per-frame basis. Transmit Error (TX_ER) is defined as any XGMII Error (E) which occurs within a packet.

The XGMII control state is received on the XGMII bus TXX_C<7:0> is translated into 4 basic control states.

| | |
|---|---|
| Idle | No data to be transmitted |
| Data Valid all | 64 bits of data to be transmitted |
| Data Valid Low | 1 to 7 bytes of data valid in the low order bytes |
| Data Valid High | 1 to 7 bytes of data valid in the high order bytes |

The control state is encoded within the XGMII transmit Controller 50 into the two bits, C<1:0>, using the mapping in Table 2.

TABLE 2

Control State Encoding

| C1 | C0 | Control State |
|---|---|---|
| 0 | 0 | Idle |
| 0 | 1 | Data Valid Low |
| 1 | 0 | Data Valid High |
| 1 | 1 | Data Valid All |

C<1:0> and TX_ER define primary control states for the data nsfers as shown in Table 3.

TABLE 3

Transmit Data Bus Control Encoding

| C1 | C0 | TX_ER | TXD<63:0> | Description |
|---|---|---|---|---|
| 0 | 0 | 0 | 0x0000000000000000 | Idle |
| 0 | 0 | 1 | Reserved | Idle on medium, reserved communication |
| 1 | 1 | 0 | 0x00.00 to 0xFF . . . FF | Transmit Data Valid All |
| 0 | 1 | 0 | See Table 3 | Transmit Data Valid Low |
| 1 | 0 | 0 | See Table 4 | Transmit Data Valid High |
| 1 | 1 | 1 | Not defined | Transmit Error |
| 0 | 1 | 1 | Not defined | Transmit Error |
| 1 | 0 | 1 | Not defined | Transmit Error |

Further encoding of valid data bytes is contained within the data bus itself during the Data Valid High and Data Valid Low states. These are shown in Tables 4 and 5.

TABLE 4

Transmit Data Valid Low Encoding

| TXD <63:59> | TXD <58> | TXD <57> | TXD <56> | TXD <55:0> | Description |
|---|---|---|---|---|---|
| Reserved | 0 | 0 | 0 | Reserved | Reserved |
| Reserved | 0 | 0 | 1 | Idle*/Data | 1 byte valid, TXD<7:0> |
| Reserved | 0 | 1 | 0 | Idle*/Data | 2 bytes valid, TXD<15:0> |
| Reserved | 0 | 1 | 1 | Idle*/Data | 3 bytes valid, TXD<23:0> |
| Reserved | 1 | 0 | 0 | Idle*/Data | 4 bytes valid, TXD<31:0> |
| Reserved | 1 | 0 | 1 | Idle*/Data | 5 bytes valid, TXD<39:0> |
| Reserved | 1 | 1 | 0 | Idle*/Data | 6 bytes valid, TXD<47:0> |
| Reserved | 1 | 1 | 1 | Idle*/Data | 7 bytes valid, TXD<55:0> |

*Unused TXD bytes are set to 0x00

TABLE 5

Transmit Data Valid High Encoding

| TXD <7:3> | TXD <2> | TXD <1> | TXD <0> | TXD <55:0> | Description |
|---|---|---|---|---|---|
| Reserved | 0 | 0 | 0 | Reserved | Reserved |
| Reserved | 0 | 0 | 1 | Data/Idle* | 1 byte valid, TXD<63:56> |
| Reserved | 0 | 1 | 0 | Data/Idle* | 2 bytes valid, TXD<63:48> |
| Reserved | 0 | 1 | 1 | Data/Idle* | 3 bytes valid, TXD<63:40> |
| Reserved | 1 | 0 | 0 | Data/Idle* | 4 bytes valid, TXD<63:32> |
| Reserved | 1 | 0 | 1 | Data/Idle* | 5 bytes valid, TXD<63:24> |
| Reserved | 1 | 1 | 0 | Data/Idle* | 6 bytes valid, TXD<63:16> |
| Reserved | 1 | 1 | 1 | Data/Idle* | 7 bytes valid, TXD<63:8> |

*Unused TXD bytes are set to 0x00

Transmit Error (TX_ER) is encoded by the XGMII Transmit Controller as follows.

If the current control state is Idle then no action is taken because the error is not within a packet.

If the current control state is Data Valid Low the control state is sent with the TXD[3] bit set in the reserved control space.

If the current control state is Data Valid High the control state is sent with the TXD[59] bit set in the reserved control space.

If the current control state is Data Valid All the control state is changed to Data Valid High with the TXD[59] bit set in the reserved control space.

Data ECC Encoder

The Data ECC generator 52 generates seven redundant bits, E<6:0>, from the 65-bit data payload comprising the data carried on TXD<63:0> received from the XGMII Transmit Control Logic 50 and the monitor channel bit of the monitor channel 26. The seven ECC bits are generated using a CRC algorithm that provides single bit error correction, double bit error detection and six bit burst error detection. Additional error detection capabilities are realized when the CRC detection is combined with the parity protection added later. This is equivalent to most commonly used 8-bit cyclic redundancy checkers that have (1+x) as a factor in the polynomial.

The message polynomial, M(x), is generated from the data and monitor transmit payload, TXD<63:0> and the monitor bit M, using the convention that the highest polynomial term is the first bit on the wire, IE bit 0.

$$M(x) = TXD0x^{64} + TXD1x^{63} + \ldots + TXD62x^2 + TXD63x + M$$

The message polynomial is then divided by the generating polynomial, G(x), to produce the quotient, Q(x), and the remainder, E(x).

$$\frac{x^7 M(x)}{G(x)} = Q(x) + \frac{E(x)}{G(x)}$$

Where E(x) has the form $$E(x) = E0x^6 + E1x^5 + \ldots + E5x + E6$$

The transmit message is then the concatenation of the message, M(x), and the remainder, E(x).

$$TX(x) = M(x) + E(x)$$

This 72 bit payload is then inserted in the physical coding sublayer cell format depicted in FIG. 4 and has the property that it is divisible by G(x) in the absence of errors.

The generating polynomial, G(x), in the preferred embodiment, was chosen to minimize the number of gates in the implementation.

$$G(x)=x^7+x+1$$

Shown below are the reduced XOR logical equations that constitute the CRC function within the data ECC generator 52 for the exemplary embodiment herein disclosed.

$E0=TXD2+TXD5+TXD9 +$ $TXD10+TXD11+TXD16+TXD18 +$ $TXD19+TXD20+TXD21+TXD22 +$ $TXD25+TXD27+TXD29+TXD30 +$ $TXD31+TXD34+TXD35+TXD37 +$ $TXD41+TXD44+TXD45+TXD46 +$ $TXD47+TXD51+TXD53+TXD58 +$ $TXD59;$ $E1=TXD0+TXD3+TXD6 +$ $TXD10+TXD11+TXD12+TXD17 +$ $TXD19+TXD20+TXD21+TXD22 +$ $TXD23+TXD26+TXD28+TXD30 +$ $TXD31+TXD32+TXD35+TXD36 +$ $TXD38+TXD42+TXD45+TXD46 +$ $TXD47+TXD48+TXD52+TXD54 +$ $TXD59+TXD60;$ $E2=TXD0+TXD1+TXD4 +$ $TXD7+TXD11+TXD12+TXD13 +$ $TXD18 +$ $TXD20+TXD21+TXD22+TXD23 +$ $TXD24 +$ $TXD27+TXD29+$ $TXD31+TXD32+TXD33 +$ $TXD36+TXD37+TXD39+TXD43 +$ $TXD46+TXD47+TXD48+TXD49 +$ $TXD53+TXD55+TXD60+TXD61;$ $E3=TXD1+TXD2+TXD5 +$ $TXD8+TXD12+TXD13+TXD14+TXD19 +$ $TXD21+TXD22+TXD23+TXD24 +$ $TXD25+TXD28+TXD30 +$ $TXD32+TXD33+TXD34 +$ $TXD37+TXD38+TXD40 +$ $TXD44+TXD47+TXD48 +$ $TXD49+TXD50+TXD54 +$ $TXD56+TXD61+TXD62;$ $E4=TXD0+TXD2+TXD3 +$ $TXD6+TXD9+TXD13+TXD14 +$ $TXD15+TXD20+TXD22+TXD23 +$ $TXD24+TXD25+TXD26+TXD29 +$ $TXD31+TXD33+TXD34+TXD35 +$ $TXD38+TXD39+TXD41+TXD45 +$ $TXD48+TXD49+TXD50+TXD51 +$ $TXD55+TXD57+TXD62+TXD63;$ $E5=TXD0+TXD1+TXD3 +$ $TXD4+TXD7+TXD10+TXD14 +$ $TXD15+TXD16+TXD21+TXD23 +$ $TXD24+TXD25+TXD26+TXD27 +$ $TXD30+TXD32+TXD34+TXD35 +$ $TXD36+TXD39+TXD40+TXD42 +$ $TXD46+TXD49+TXD50+TXD51 +$ $TXD52+TXD56+TXD58+TXD63 +M;$ $E6=TXD1+TXD4+TXD8 +$ $TXD9+TXD10+TXD15+TXD17 +$ $TXD18+TXD19+TXD20+TXD21 +$ $TXD24+TXD26+TXD28 +$ $TXD29+TXD30+TXD33 +$ $TXD34+TXD36+TXD40 +$ $TXD43+TXD44+TXD45 +$ $TXD46+TXD50+TXD52 +$ $TXD57+TXD58+M;$

Transmit Channel Assignments

The transmit data bus, monitor bit and ECC bits are divided into separate groups which are then scrambled as subsequently described and transmitted over respective channels. In the present embodiment, the 64 data bits comprising the parallel input data word, the monitor bit and the seven (7) ECC bits comprise 72 bits that are split into four 18 bit groups as indicated below. This is the function of the transmit interleaver 53. This interleaver may comprise active logic to drive respective signals or alternatively may simply define the coupling of appropriate outputs TXD<63:0>, E<6:0> and M to the appropriate inputs of the transmit scrambler logic 54 as defined below.

TXPa<17:0>=<E0, M, TXD15, TXD14, TXD13, TXD12, TXD11, TXD10, TXD9, TXD8, TXD7, TXD6, TXD5, TXD4, TXD3, TXD2, TXD1, TXD0>

TXPb<17:0>=<E2, E1, TXD31, TXD30, TXD29, TXD28, TXD27, TXD26, TXD25, TXD24, TXD23, TXD22, TXD21, TXD20, TXD19, TXD18, TXD17, TXD16>

TXPc<17:0>=<E4, E3, TXD47, TXD46, TXD45, TXD44, TXD43, TXD42, TXD41, TXD40, TXD39, TXD38, TXD37, TXD36, TXD35, TXD34, TXD33, TXD32>

TXPd<17:0>=<E6, E5, TXD63, TXD62, TXD61, TXD60, TXD59, TXD58, TXD57, TXD56, TXD55, TXD54, TXD53, TXD52, TXD51, TXD50, TXD49, TXD48>

Transmit Scrambler

The transmit scrambler 54 is used to provide DC balance, insert transitions, spread the signal spectrum across the available bandwidth and produce low EMI. The incoming data is XORed with the scrambler's pseudo random binary sequence (PRBS).

Figure 5:
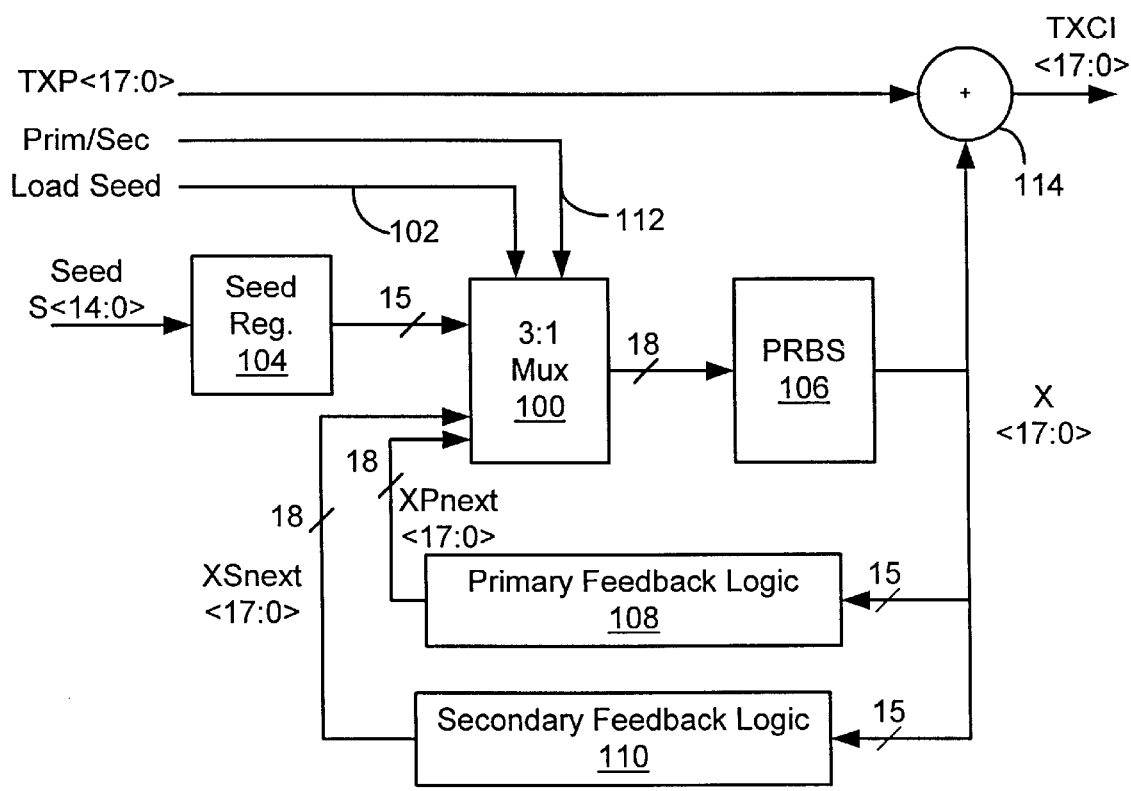
FIG. 5 is a block diagram of a side scrambler for scrambling data in each channel of the transmit portion of the physical coding sublayer logic.

Each channel has a separate side-stream scrambler 54a, 54b, 54c and 54d, which is generating the same sequence, but offset in time, so the channels are de-correlated locally in time. A more detailed block diagram depicting an exemplary structure of the side-stream scramblers 54a, 54b, 54c and 54d is shown in FIG. 5. While only one side-stream scrambler is shown in FIG. 5, all of the scramblers operate in a similar manner. In a preferred embodiment, de-correlation is achieved over +/−2.6 us using a pseudo random binary sequence of length 15, which is sufficient to de-correlate Near End Crosstalk (NEXT) and Far End Crosstalk (FEXT) contributions from other channels. The time offset of the sequences in the respective channels is achieved by loading different seed values in each channel at startup. Separate scramblers are used to keep global interconnect low while providing a scalable structure. Alternatively, a centralized scrambler may be employed.

Offset scramblers also effectively encode channel skew information into the transmission words that could be used by the receiver to establish inter-channel skew. The cell encoder uses a more direct method of establishing inter-channel alignment so checking this relationship within the receiver is optional.

In the illustrated embodiment, a pseudo random binary sequence of length 15 (PRBS15) was chosen to allow receiver synchronization within one Idle transmission period. Data in each channel is defined to be constant at 0x00 during an idle transmission. The monitor bit, and, consequently, the error correction bits, E5 and E6 bits, are not guaranteed to have a known state during idle. The first 15 bits within each channel, i.e. TXCx<14:0>, give the state of the scrambler so the 15 bit seed can be recovered completely within each 80-bit idle cell.

Two PRBS15 sequences are included, primary and secondary. The receiver waveform can be de-correlated from the transmitter NEXT if both ends of the link are using different sequences. Correlation can occur as the near and far end sequences come in phase if both ends of the link are operating asynchronously or if startup at each end of the link is not phased correctly. Selecting which sequence to use is typically not worth the complexity of establishing a startup protocol, however, sequence choice could be done out-of-band within a closed system and add very little complexity to the physical coding sublayer logic.

Scrambler Implementation

An exemplary side-stream scrambler implementation is depicted in FIG. 5. Each of the scramblers 54a, 54b, 54c, 54d (See FIG. 3) employs the logic depicted in FIG. 5 in a preferred embodiment. The side stream scramblers includes a three to one MUX 100. The MUX 100 has a control signal 102 that enables the loading of 15 bits of data from a seed register 104. Additionally, the three to one MUX 100 has an output bus that is coupled to a pseudo random binary sequence (PRBS) register 106. The outputs of the PRBS register 106 are coupled to the inputs of primary feedback logic 108 and secondary feedback logic 110. The outputs of the primary and secondary feedback logic are fed back to inputs of the three to one MUX 100. Either the primary or secondary feedback logic outputs are selected as the operative input to the three to one MUX 100 in response to a primary/secondary selection control signal 112. Exclusive OR logic 114 receives as inputs transmit data from bus TXP<17:0> and the PRBS register 106 outputs X<17:0>. The signals on TXP<17:0> and X<17:0> are exclusive ORed by exclusive OR logic 114 to produce cipher data TXCI<17:0> at each of the respective scrambler outputs; e.g. TXCIa<17:0>, TXCIb<17:0>, TXCIc<17:0> and TXCId<17:0>.

The two generator polynomials used for the primary and secondary PRBS15 sequences are:

$G_P(x) = 1 + x^{14} + x^{15}$ (Primary generator)
$G_S(x) = 1 + x^{11} + x^{15}$ (Secondary generator)

These sequences have known linear feedback shift register (LFSR) implementations. To achieve high speed, the physical coding sublayer 14 employs an 18-bit parallel implementation for the side scramblers, which is obtained by applying 18 levels of recursion to the LFSR equations to produce the bus wide pseudo random binary sequence generator structure illustrated in FIG. 5.

The feedback equations for the primary sequence are shown below. The bit ordering is such that the pseudo random binary sequence will appear on the serial lines in the same order as would be generated by the linear feedback shift register approach.

$XPnext0 = X3 + X4;$ $XPnext1 = X4 + X5;$ $XPnext2 = X5 + X6;$ $XPnext3 = X6 + X7;$ $XPnext4 = X7 + X8;$ $XPnext5 = X8 + X9;$ $XPnext6 = X9 + X10;$ $XPnext7 = X10 + X11;$ $XPnext8 = X11 + X12;$ $XPnext9 = X12 + X13;$ $XPnext10 = X13 + X14;$ $XPnext11 = X0 + X1 + X14;$ $XPnext12 = X0 + X2;$ $XPnext13 = X1 + X3;$ $XPnext14 = X2 + X4;$ $XPnext15 = X3 + X5;$ $XPnext16 = X4 + X6;$ $XPnext17 = X5 + X7;$ The primary seeds to start a four-channel transmitter up are:

$S_A = 0x7FFF \ (M(0))$ $S_B = 0x7F00 \ (M(\frac{1}{2}))$ $S_C = 0x70FF$ ($M(¼)$)

$S_D = 0x780F$ ($M(¾)$)

Where M(x) denotes the relative starting position in the maximum length sequence.

Similarly, the feedback equations for the secondary sequence are shown below.

$XSnext0 = X3 + X7$;

$XSnext1 = X4 + X8$;

$XSnext2 = X5 + X9$;

$XSnext3 = X6 + X10$;

$XSnext4 = X7 + X11$;

$XSnext5 = X8 + X12$;

$XSnext6 = X9 + X13$;

$XSnext7 = X10 + X14$;

$XSnext8 = X0 + X4 + X11$;

$XSnext9 = X1 + X5 + X12$;

$XSnext10 = X2 + X6 + X13$;

$XSnext11 = X3 + X7 + X14$;

$XSnext12 = X0 + X8$;

$XSnext13 = X1 + X9$;

$XSnext14 = X2 + X10$;

$XSnext15 = X3 + X11$;

$XSnext16 = X4 + X12$;

$XSnext17 = X5 + X13$;

The secondary seeds to start a four-channel transmitter up are:

$S_A = 0x7FFF$ ($M(0)$)

$S_B = 0x00CC$ ($M(½)$)

$S_C = 0x0AAA$ ($M(¼)$)

$S_D = 0x0008$ ($M(¾)$)

Where M(x) denotes the relative starting position in the maximum length sequence.

The outputs of the respective side scramblers provide scrambled or cipher data that are identified as TXCIa<17:0>, TXCIb<17:0>, TXCIc<17:0> and TXCId<17:0> as indicated above. The side scrambler output buses are coupled to the inputs of a Parity and FEC Control Matrix 56 which is shown in FIG. 3 and depicted with greater particularity in FIG. 6.

Parity and Control PFC Matrix

Figure 6:
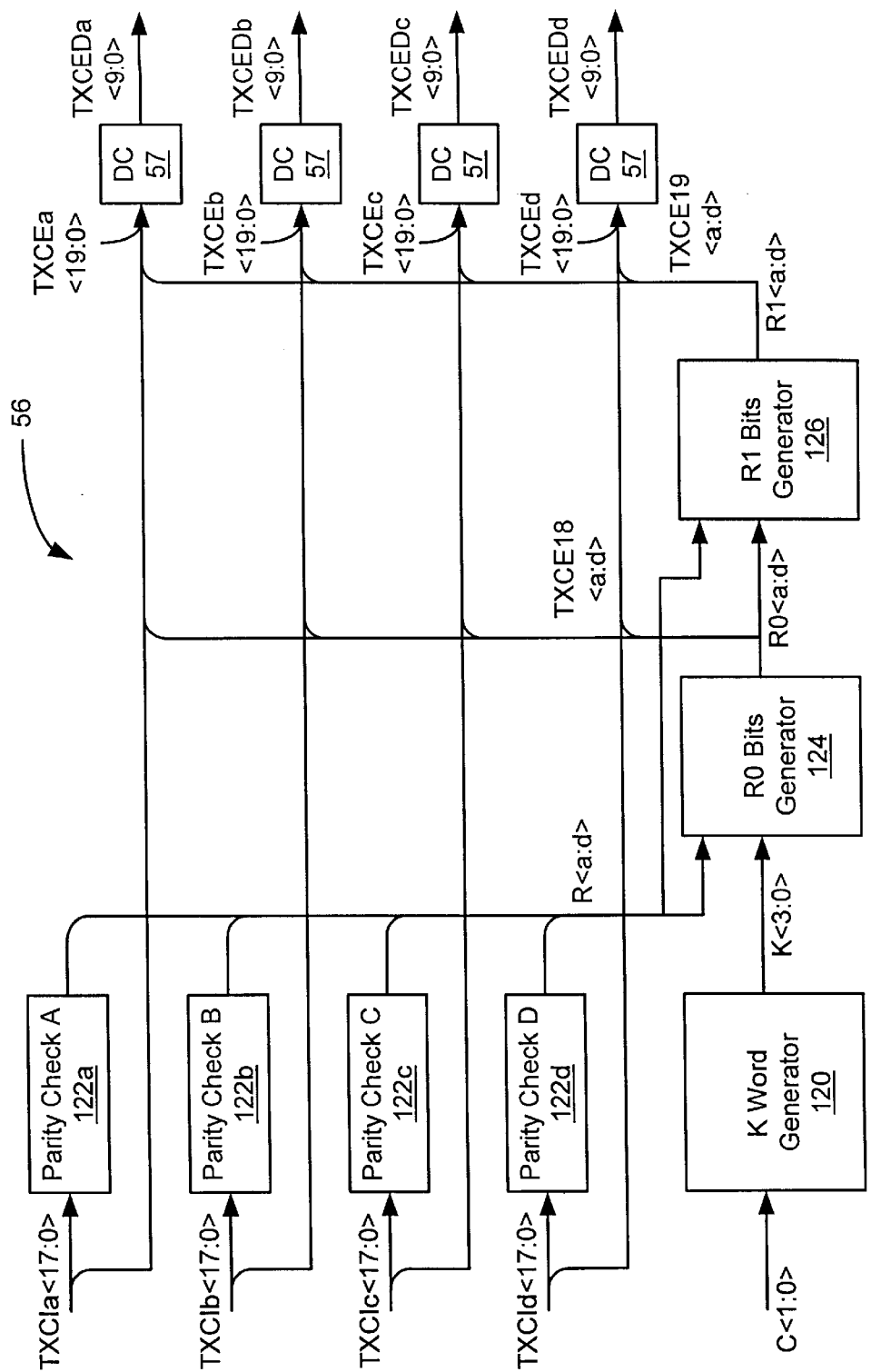
FIG. 6 is a block diagram depicting parity and control error correction code (ECC) encoder logic employed in the transmit portion of the physical coding sublayer logic.

Referring to FIG. 6. The Parity and Control ECC Logic 56 generates two additional bits in each channel. The two bits per channel carry the transmit control state and provide parity for the respective channels. The bits are used to obtain alignment on word boundaries within each channel (word alignment) and additionally to obtain interchannel alignment. These added bits are redundant with a Hamming distance of 4 to allow correction of single bit control errors and detection of two-bit errors. The inputs to the parity and control ECC encoder 56 comprise the control bus c<1:0> and the TXCI bus data from the scramblers 54a–54d. The parity and Control ECC encoder generates extended cipher data words TXCEa<19:0> through TXCEd<19:0> (See FIG. 6) which are applied to double clock logic 57 (See FIG. 3). The double clock logic 57 clocks out the 20 bit per channel TXCE data as two sequential 10 bit words TXCED<9:0> to reduce the number of signal lines that need to be accommodated within the system.

The first of the two parity bits previously identified as the CECC bit and referred to in the drawing as the R0 bit, starts with the definition of a new variable, K<3:0> in a K word generator 120. The K word generator 120 receives as an input the control word C<1:0> from the XGMII Transmit Control Logic 50. The output of the K word generator 120 comprises a four bit wide bus K<3:0> that holds the control state redundantly and has zero DC content. The states themselves have a minimum Hamming distance of 2 and require the additional information from the parity bits R1 discussed below to increase the Hamming distance to 4 and allow correction to be performed. The generation of the K values based upon the C<1:0> inputs is illustrated below in Table 6.

TABLE 6

| Control Word Output | | | | | |
|---|---|---|---|---|---|
| Control State | | Coding Output | | | |
| C1 | C0 | K3 | K2 | K1 | K0 |
| 0 | 0 | 1 | 1 | 0 | 0 |
| 0 | 1 | 1 | 0 | 0 | 1 |
| 1 | 0 | 0 | 1 | 1 | 0 |
| 1 | 1 | 0 | 0 | 1 | 1 |

Intermediate parity checks, R<a:d>, are calculated on the 72-bit TXCI data payload (data+Monitor+data EVC) in parity check logic 122a, 122b, 122c and 122d as follows:

$$R_a = \sum_{k=0}^{17} TXCI_a(k)$$

$$R_b = \sum_{k=0}^{17} TXCI_b(k)$$

$$R_c = \sum_{k=0}^{17} TXCI_c(k)$$

$$R_d = \sum_{k=0}^{17} TXCI_d(k)$$

Thus, Ra indicates the parity of the data contained in TXCIa<17:0>, Rb indicates the parity of the data contained in TXCIb<17:0>, Rc indicates the parity of the data contained in TXCIc<17:0> and Rd indicates the parity of the data contained in TXCId<17:0>. The parity check variables are random if the TXCI payload is random, which will be the case due to the use of side-stream scramblers 54a, 54b, 54c and 54d. The intermediate parity bits Ra, Rb, Rc and Rd are XORed with the K bits in R0 bit generation logic 124 to scramble the control state and the R0 bits are further rotated across the channels to permit inter-channel skew detection. The resulting R0<a:d> bits are transmitted as the TXCE18<a:d> bits in each channel and are defined as follows.

$$TXCE18_a = R0_a = R_d + K0$$

$$TXCE18_b = R0_b = R_a + K1$$

$$TXCE18_c = R0_c = R_b + K2$$

$$TXCE18_d = R0_d = R_c + K3$$

Finally, the overall parity across all 19 bits in each channel is calculated in R1 bit generation logic 126 and transmitted in the TXCE19<a:d> slot as illustrated in FIG. 4. These bits are designated as the R1<a:d> bits and calculated as indicated below.

$$TXCE19_a = R1_a = !\sum_{k=0}^{18} TXC_a(k) = !(R_a + R0_a)$$

$$TXCE19_b = R1_b = !\sum_{k=0}^{18} TXC_b(k) = !(R_b + R0_a)$$

$$TXCE19_c = R1_c = !\sum_{k=0}^{18} TXC_c(k) = !(R_c + R0_c)$$

$$TXCE19_d = R1_d = !\sum_{k=0}^{18} TXC_d(k) = !(R_d + R0_d)$$

The R1<a:d> (TXCE19) bits are used as parity bits to enhance error correction and detection in both the data and control payloads. They also provide correlation information to allow word and channel alignment to be achieved as discussed further below. Inversion of the parity guarantees at least one transition within the 20-bit word. Two worst case words back to back can produce the maximum run length of 38 with a probability of 3.6E-12.

Within each channel all bits in a word sum to one in the absence of any errors. This characteristic is used to acquire word alignment.

$$\sum_{k=0}^{19} TX_a(k) = 1$$

$$\sum_{k=0}^{19} TX_b(k) = 1$$

$$\sum_{k=0}^{18} TX_c(k) = 1$$

$$\sum_{k=0}^{18} TX_d(k) = 1$$

Additionally, when the channels are correctly aligned all R1 bits within a cell sum to zero in the absence of errors.

$$TXCE19_a + TXCE19_b + TXCE19_d + TXCE19_d = 0$$

$$R1_a + R1_b + R1_d + R1_d = 0$$

This is used to achieve channel alignment which is discussed below.

Receive Path

Figure 7:
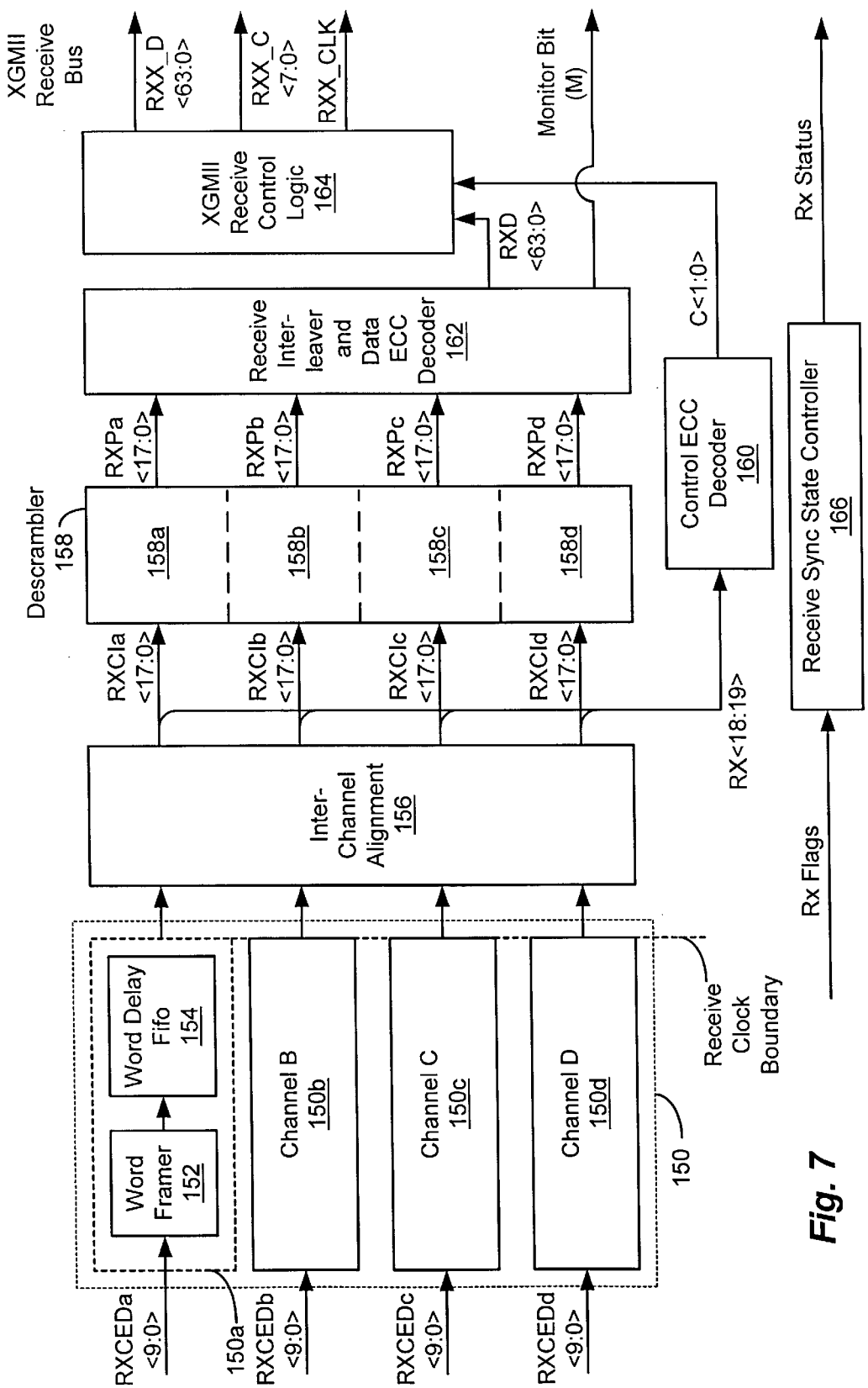
FIG. 7 is a block diagram of receive logic employed within the physical coding sublayer logic.

The receive path through the physical coding sublayer 14 is depicted in FIG. 7. Referring to FIG. 7, the receive path roughly follows the transmit path in reverse with the added complexity of having to acquire word and inter-channel alignment and perform error correction.

Channels A, B, C and D include channel receive logic 150 that comprise word framer logic 152 and a word delay FIFO 154. The channel receive logic for channels A, B, C and D are designated as channel receive logic 150a, 150b, 150c and 150d respectively and receive parallel data over buses RXCEDa<9:0>–RXCEDd<9:0>. The outputs of the channel receive logic 150a, 150b, 150c and 150d are coupled to inter-channel alignment logic 156 which in turn has outputs that are coupled to a descrambler 158 and a control ECC Decoder 160. The outputs from the descrambler 158 are coupled to receive interleave and data ECC decode logic 162. The outputs from the receive interleave and data ECC logic 162 and the control ECC decode logic 160 are coupled to the XGMII receive controller 164. The XGMII receive controller produces at its output the original parallel data word on the bus RXX_D<63:0>, the original control byte on bus RXX_C<7:0> and a receive clock RXX_CLK. The receive interleave and data ECC logic 162 also provides as an output the bit M of the monitor channel as depicted in FIG. 7.

Alignment of receive data is achieved in several steps. Each step is dependent on acquisition of the previous steps. Acquisition starts with achieving word-frame alignment within each channel. The channels are then de-skewed to achieve inter-channel alignment and finally the scrambler states are acquired during an idle transmission.

The receive channels are synchronous but do not have a defined phase at the input to the receiver after de-serialization. All channels are synchronized to a master channel which in the present embodiment is defined to be channel A. Inter-channel alignment is accomplished in the inter-channel alignment block 156. The inter-channel alignment block includes a FIFO structure in the respective channels to permit the changing of clock domains.

The bit error rate (BER) during acquisition is assumed to be reasonably good (better than 1E-6) such that there is a high probability that correlation calculations done over 256 words will not experience an error.

Word Frame Alignment

Figure 8:
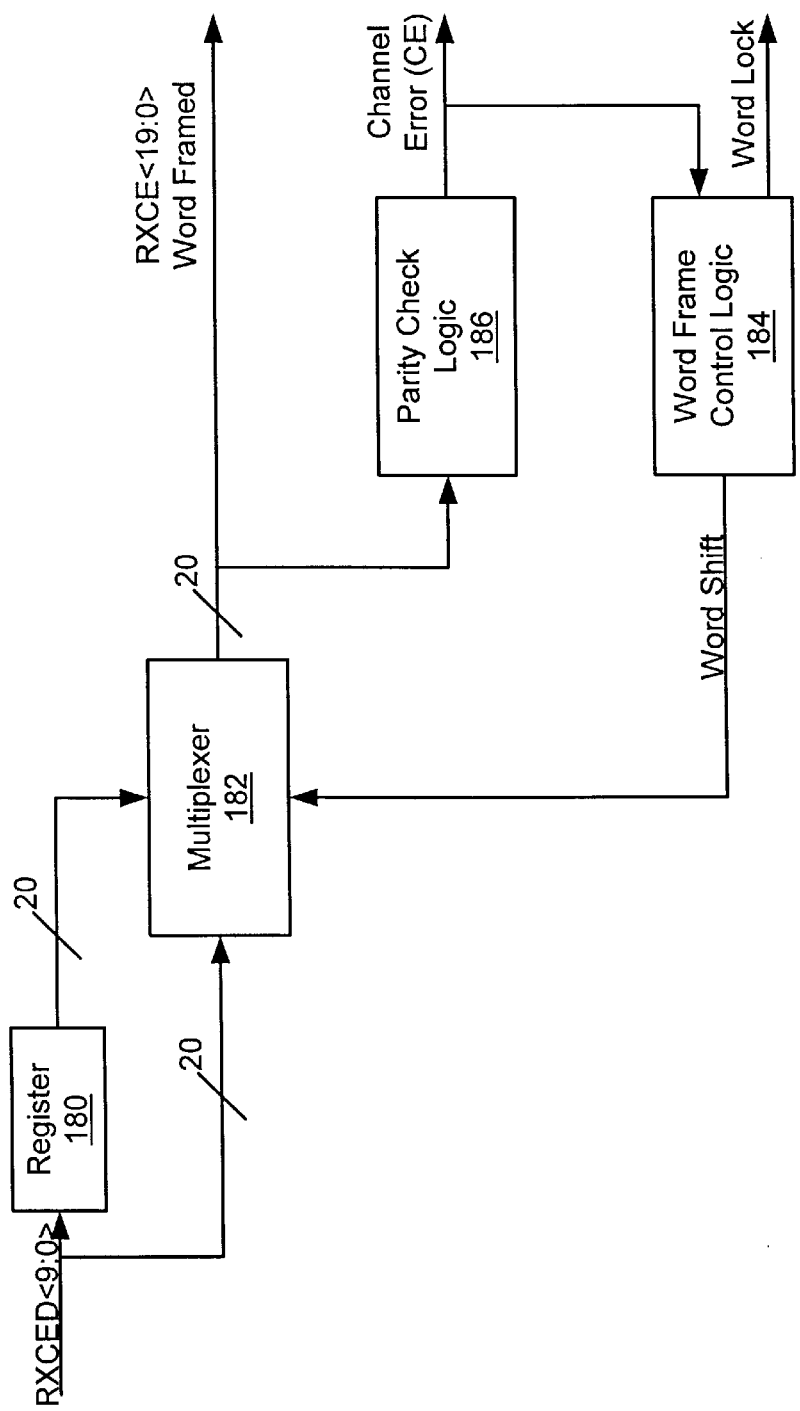
FIG. 8 is a block diagram of word framer logic employed in the receive portion of the physical coding sublayer logic.

Word framing logic that may be employed in each of the receive channels is depicted with greater particularity in FIG. 8. Word framing within each channel is obtained by checking for correct parity across a word (20 bits). The word frame control state machine shifts the word framing until the parity calculations are correct over a sample period (typically 256 words). Acquisition is then declared. This process is duplicated in all the channels. The parity R1 bit is derived from scrambled data and can be considered to have a random distribution. This allows acquisition to be obtained with a low probability of false alignment.

The parity calculation is done over 20 receive bits to produce the Channel Error (CE) variable.

$$CE(n) = !\sum_{k=0}^{19} RX(k) = 0$$

Each CE bit has roughly a 50% chance of being correct (=0) in a random data stream. Integrating over N samples gives the required low probability of false alignment.

$$\sum_{n=0}^{N} CE(n) = 0$$

The probability of false alignment is 3E-39 if the calculation is done over 128 words (N=128), 9E-78 over 256 words (N=256) with random data.

One exemplary technique for obtaining word framing is illustrated in FIG. 8. The received word is delayed in a register 180 to produce a delayed word and fed into a multiplexer 182 along with the un-delayed word. The multiplexer 182 has access to 40 contiguous bits of the serial stream and can re-frame across the arbitrary word boundary presented at the physical coding layer 14 logic input. The Word Frame Control logic 184 uses the output of parity logic 186 to search through the 20 possible framing options until the correct frame location is acquired. More specifically, as indicated above, the parity check logic inspects the 20 bit frame presented and provides an indication of no error if CE(n)=0 and provides an indication of a channel error if CE(n)=1. The word frame control logic 184 provides an output signal Word Lock once proper word framing has been achieved. Correct word framing is virtually assured by confirming correct parity over a large number of samples, such as 128 or 256 samples.

Receiver Inter-channel Alignment

Figure 9:
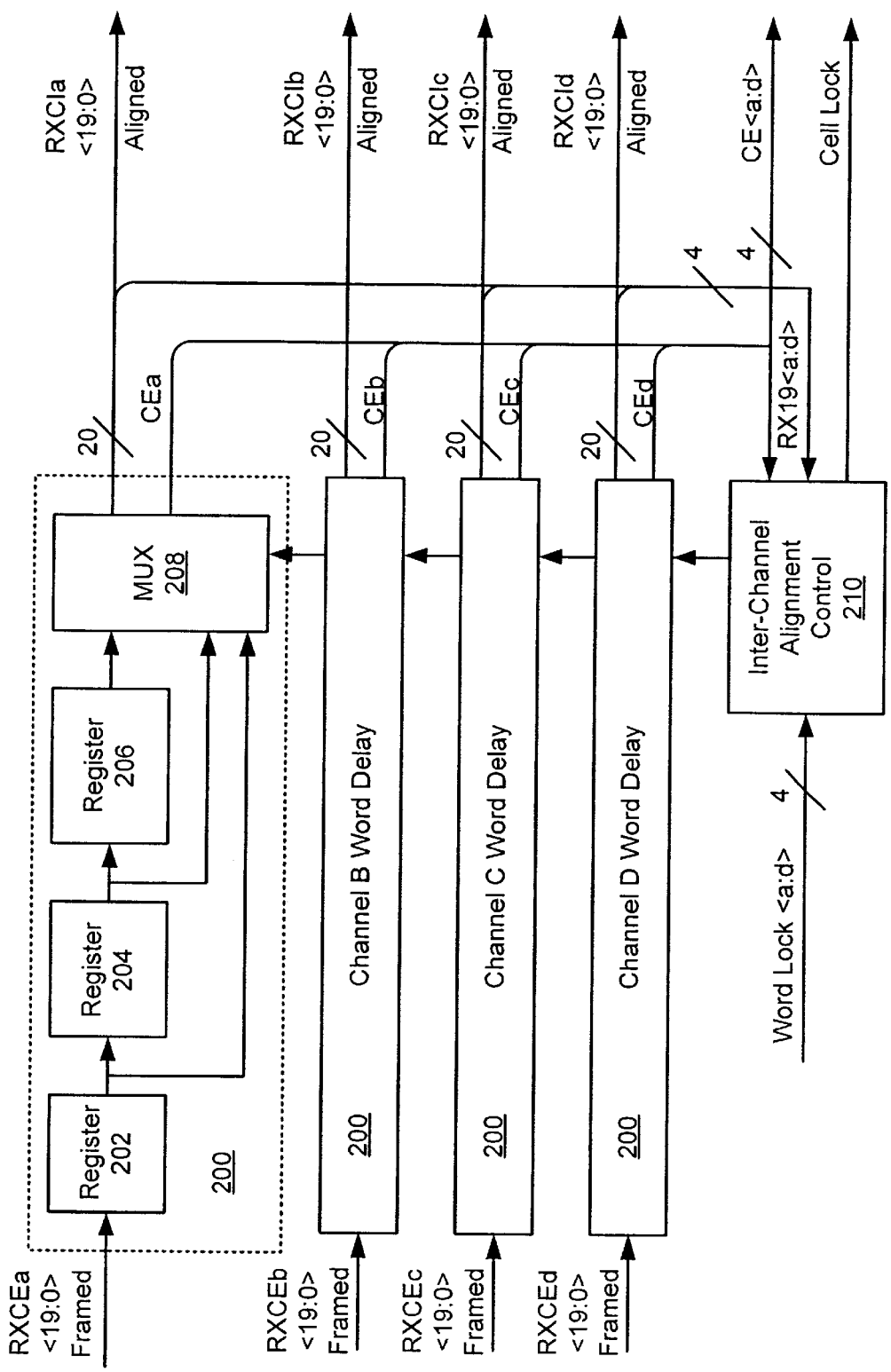
FIG. 9 is a block diagram illustrating inter-channel alignment logic employed within the receive portion of the physical coding sublayer logic.

FIG. 9 depicts an exemplary block diagram for achieving inter-channel alignment of received parallel data words. Inter-channel alignment is needed to avoid the possibility of word skew between the respective serial channels. Once word framing is achieved in all channels and the R1 bits (RX19) have been identified in each channel, inter-channel alignment can proceed. Inter-channel alignment relies on the property that the R1 parity bits sum to zero if the channels are correctly aligned (in the absence of errors).

$$A(n)=R1_a+R1_b+R1_c+R1_d==0$$

The A bit has a roughly 50% chance of being correct (=0) in a random data stream. Integrating over N samples gives the required low probability of false alignment.

$$\sum_{n=0}^{N} A(n) = 0$$

The probability of false alignment is 3E-39 if the calculation is done over 128 words (N=128), 9E-78 over 256 words (N=256) with random data.

Inter-Channel alignment can be achieved by delaying specific channels relative to other channels. Referring to FIG. 9 each channel contains word delay logic 200. The delay logic 200 in the presently disclosed embodiment includes cascaded delay registers 202, 204, 206 and a MUX 208 that selects one of the progressively delayed versions of the receive words. The number of delay stages required is a function of the possible skew that may occur during transmission through the channel and is system dependent. The implementation in FIG. 9 allows for an inter-channel skew of +/−1 word. A greater number of cascaded delay registers may be employed. The multiplexer 208 in each channel can select the appropriate delayed word as the operative input to the MUX 208. The Inter-Channel Alignment Control logic 210 adjusts the delays until the R1 bits across the four channels sum to 0 over a predetermined number of samples.

The FIFO structure of the inter-channel alignment block lends itself to re-synchronizing the B, C and D receive clocks into the channel A clock domain. The FIFOs can be initialized after word alignment has been achieved in each channel, which guarantees an acceptable BER in each channel and the link is operating in a steady state with no phase gradients caused by the phase locked loops (PLLs).

The search pattern used to acquire inter-channel alignment is somewhat arbitrary however the highest probability of achieving alignment is around the equal delay point across channels. Searching around this point can minimize acquisition time. Table 7 shows a weighted-search over +/−1 word. Executing the search in Table 8 after Table 7 will achieve a weighted-search over +/−2 words.

Channel A is used as the delay reference (always 0) and negative numbers indicate that channel is advanced relative to channel A while positive numbers indicate they are retarded in Tables 7 and 8.

TABLE 7

Channel Alignment Search +/− One Word

| Iteration | A | B | C | D |
|---|---|---|---|---|
| 1 | 0 | 0 | 0 | 0 |
| 2 | 0 | −1 | 0 | 0 |
| 3 | 0 | 0 | −1 | 0 |
| 4 | 0 | 0 | 0 | −1 |
| 5 | 0 | 0 | 0 | 1 |
| 6 | 0 | 0 | 1 | 0 |
| 7 | 0 | 1 | 0 | 0 |
| 8 | 0 | −1 | −1 | 0 |
| 9 | 0 | −1 | 0 | −1 |
| 10 | 0 | −1 | 0 | 1 |
| 11 | 0 | −1 | 1 | 0 |
| 12 | 0 | 0 | −1 | −1 |
| 13 | 0 | 0 | −1 | 1 |
| 14 | 0 | 0 | 1 | −1 |
| 15 | 0 | 0 | 1 | 1 |
| 16 | 0 | 1 | −1 | 0 |
| 17 | 0 | 1 | 0 | −1 |
| 18 | 0 | 1 | 0 | 1 |
| 19 | 0 | 1 | 1 | 0 |
| 20 | 0 | −1 | −1 | −1 |
| 21 | 0 | −1 | −1 | 1 |
| 22 | 0 | −1 | 1 | −1 |
| 23 | 0 | −1 | 1 | 1 |
| 24 | 0 | 1 | −1 | −1 |
| 25 | 0 | 1 | −1 | 1 |
| 26 | 0 | 1 | 1 | −1 |
| 27 | 0 | 1 | 1 | 1 |

TABLE 8

Channel Alignment Search +/− Two Words

| Iteration | A | B | C | D |
|---|---|---|---|---|
| 28 | 0 | −2 | 0 | 0 |
| 29 | 0 | 0 | −2 | 0 |
| 30 | 0 | 0 | 0 | −2 |
| 31 | 0 | 0 | 0 | 2 |
| 32 | 0 | 0 | 2 | 0 |
| 33 | 0 | 2 | 0 | 0 |
| 34 | 0 | −2 | −1 | 0 |
| 35 | 0 | −2 | 0 | −1 |
| 36 | 0 | −2 | 0 | 1 |
| 37 | 0 | −2 | 1 | 0 |
| 38 | 0 | −1 | −2 | 0 |
| 39 | 0 | −1 | 0 | −2 |
| 40 | 0 | −1 | 0 | 2 |
| 41 | 0 | −1 | 2 | 0 |
| 42 | 0 | 0 | −2 | −1 |
| 43 | 0 | 0 | −2 | 1 |
| 44 | 0 | 0 | −1 | −2 |
| 45 | 0 | 0 | −1 | 2 |
| 46 | 0 | 0 | 1 | −2 |
| 47 | 0 | 0 | 1 | 2 |
| 48 | 0 | 0 | 2 | −1 |
| 49 | 0 | 0 | 2 | 1 |
| 50 | 0 | 1 | −2 | 0 |
| 51 | 0 | 1 | 0 | −2 |
| 52 | 0 | 1 | 0 | 2 |
| 53 | 0 | 1 | 2 | 0 |
| 54 | 0 | 2 | −1 | 0 |
| 55 | 0 | 2 | 0 | −1 |
| 56 | 0 | 2 | 0 | 1 |
| 57 | 0 | 2 | 1 | 0 |
| 58 | 0 | −2 | −1 | −1 |

TABLE 8-continued

Channel Alignment Search +/− Two Words

| Iteration | A | B | C | D |
|---|---|---|---|---|
| 59 | 0 | −2 | −1 | 1 |
| 60 | 0 | −2 | 1 | −1 |
| 61 | 0 | −2 | 1 | 1 |
| 62 | 0 | −1 | −2 | −1 |
| 63 | 0 | −1 | −2 | 1 |
| 64 | 0 | −1 | −1 | −2 |
| 65 | 0 | −1 | −1 | 2 |
| 66 | 0 | −1 | 1 | −2 |
| 67 | 0 | −1 | 1 | 2 |
| 68 | 0 | −1 | 2 | −1 |
| 69 | 0 | −1 | 2 | 1 |
| 70 | 0 | 1 | −2 | −1 |
| 71 | 0 | 1 | −2 | 1 |
| 72 | 0 | 1 | −1 | −2 |
| 73 | 0 | 1 | −1 | 2 |
| 74 | 0 | 1 | 1 | −2 |
| 75 | 0 | 1 | 1 | 2 |
| 76 | 0 | 1 | 2 | −1 |
| 77 | 0 | 1 | 2 | 1 |
| 78 | 0 | 2 | −1 | −1 |
| 79 | 0 | 2 | −1 | 1 |
| 80 | 0 | 2 | 1 | −1 |
| 81 | 0 | 2 | 1 | 1 |
| 82 | 0 | −2 | −2 | 0 |
| 83 | 0 | −2 | 0 | −2 |
| 84 | 0 | −2 | 0 | 2 |
| 85 | 0 | −2 | 2 | 0 |
| 86 | 0 | 0 | −2 | −2 |
| 87 | 0 | 0 | −2 | 2 |
| 88 | 0 | 0 | 2 | −2 |
| 89 | 0 | 0 | 2 | 2 |
| 90 | 0 | 2 | −2 | 0 |
| 91 | 0 | 2 | 0 | −2 |
| 92 | 0 | 2 | 0 | 2 |
| 93 | 0 | 2 | 2 | 0 |
| 94 | 0 | −2 | −2 | −1 |
| 95 | 0 | −2 | −2 | 1 |
| 96 | 0 | −2 | −1 | −2 |
| 97 | 0 | −2 | −1 | 2 |
| 98 | 0 | −2 | 1 | −2 |
| 99 | 0 | −2 | 1 | 2 |
| 100 | 0 | −2 | 2 | −1 |
| 101 | 0 | −2 | 2 | 1 |
| 102 | 0 | −1 | −2 | −2 |
| 103 | 0 | −1 | −2 | 2 |
| 104 | 0 | −1 | 2 | −2 |
| 105 | 0 | −1 | 2 | 2 |
| 106 | 0 | 1 | −2 | −2 |
| 107 | 0 | 1 | −2 | 2 |
| 108 | 0 | 1 | 2 | −2 |
| 109 | 0 | 1 | 2 | 2 |
| 110 | 0 | 2 | −2 | −1 |
| 111 | 0 | 2 | −2 | 1 |
| 112 | 0 | 2 | −1 | −2 |
| 113 | 0 | 2 | −1 | 2 |
| 114 | 0 | 2 | 1 | −2 |
| 115 | 0 | 2 | 1 | 2 |
| 116 | 0 | 2 | 2 | −1 |
| 117 | 0 | 2 | 2 | 1 |
| 118 | 0 | −2 | −2 | −2 |
| 119 | 0 | −2 | −2 | 2 |
| 120 | 0 | −2 | 2 | −2 |
| 121 | 0 | −2 | 2 | 2 |
| 122 | 0 | 2 | −2 | −2 |
| 123 | 0 | 2 | −2 | 2 |
| 124 | 0 | 2 | 2 | −2 |
| 125 | 0 | 2 | 2 | 2 |

Receiver Control Decoder

Figure 10:
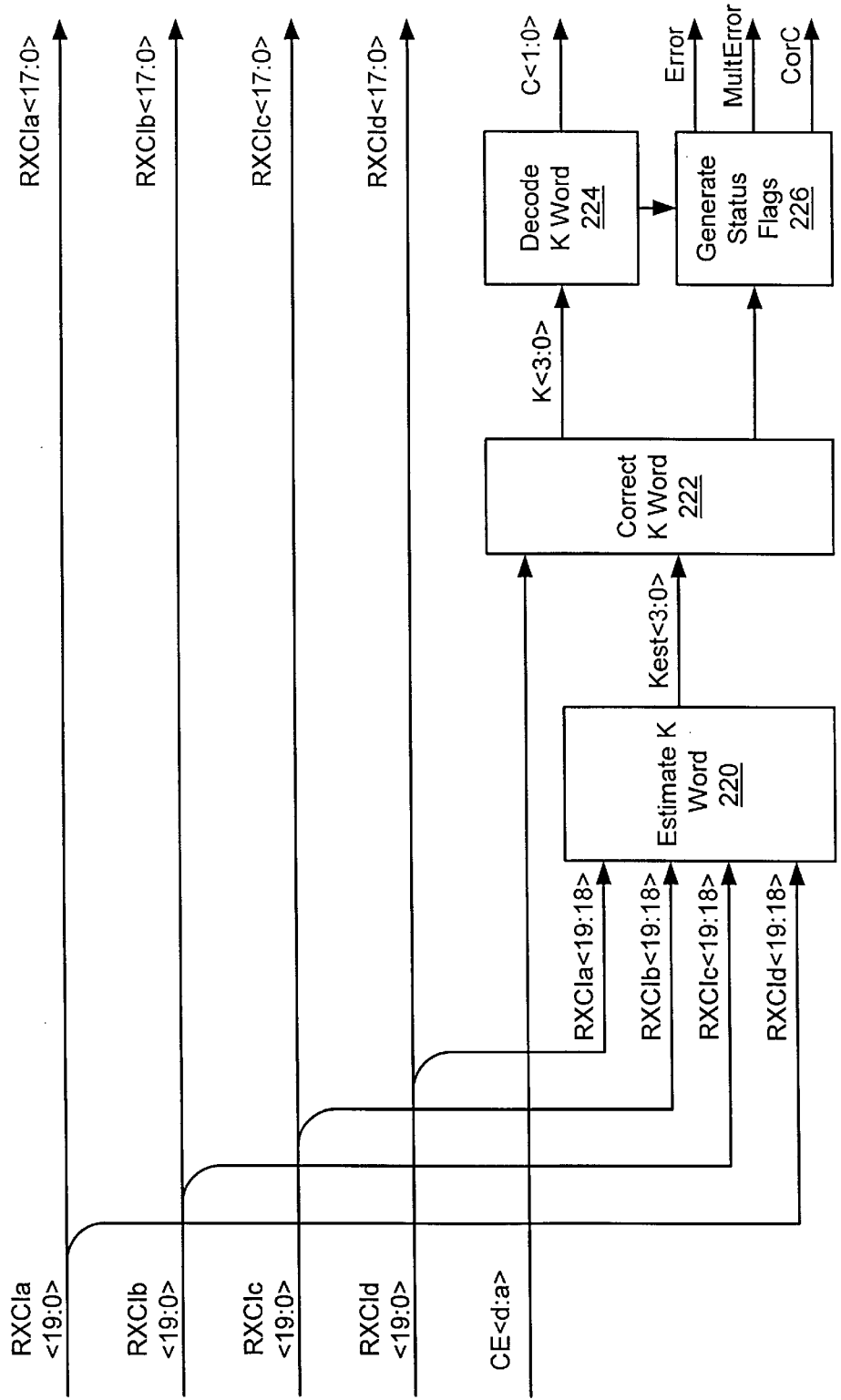
FIG. 10 is a block diagram illustrating control error correction code (ECC) decoder logic employed in the receive portion of the physical coding sublayer logic.
Figure 11A:
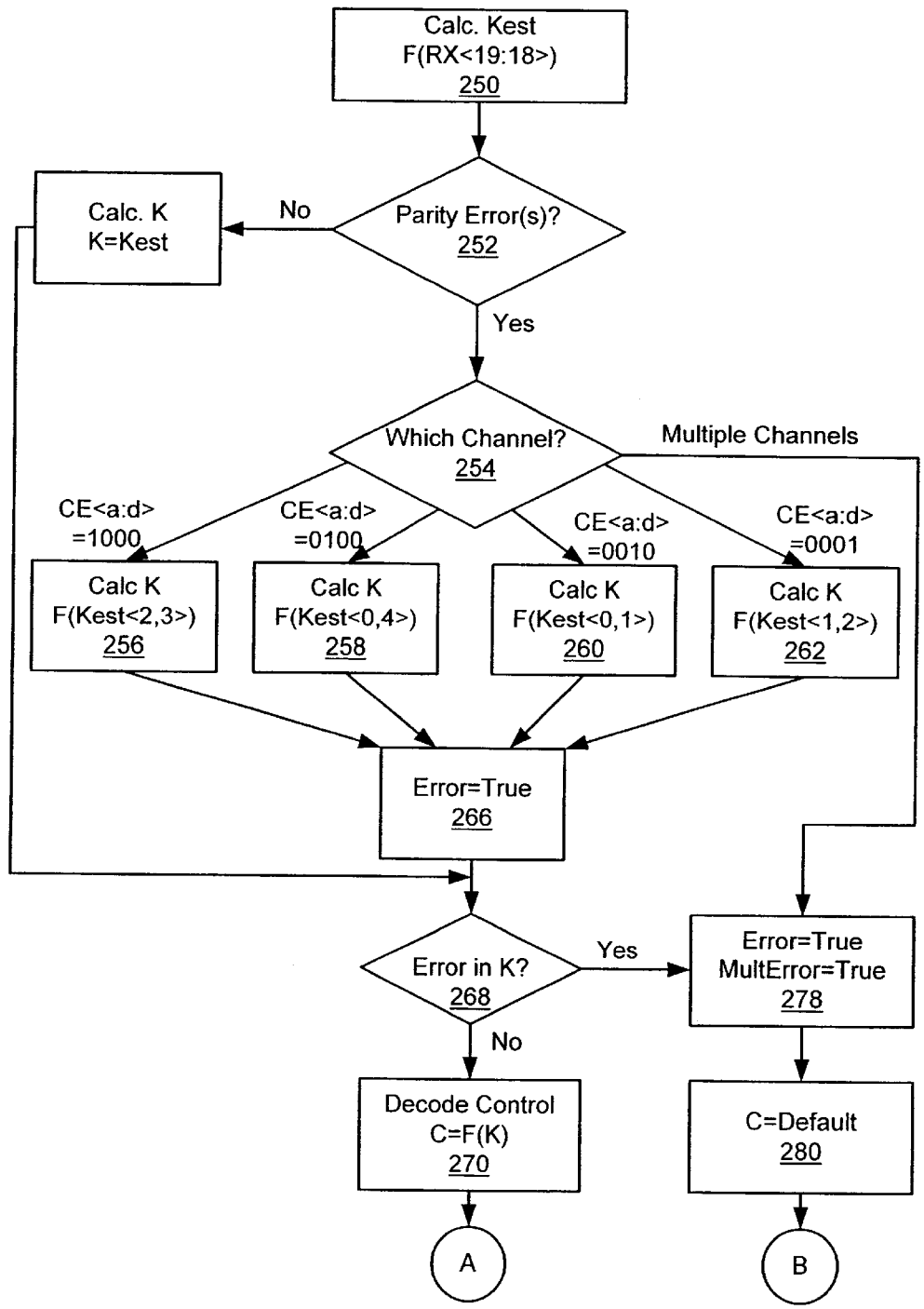
FIGS. 11a and 11b are a flow diagram illustrating error correction code (ECC) decoder operation.
Figure 11B:
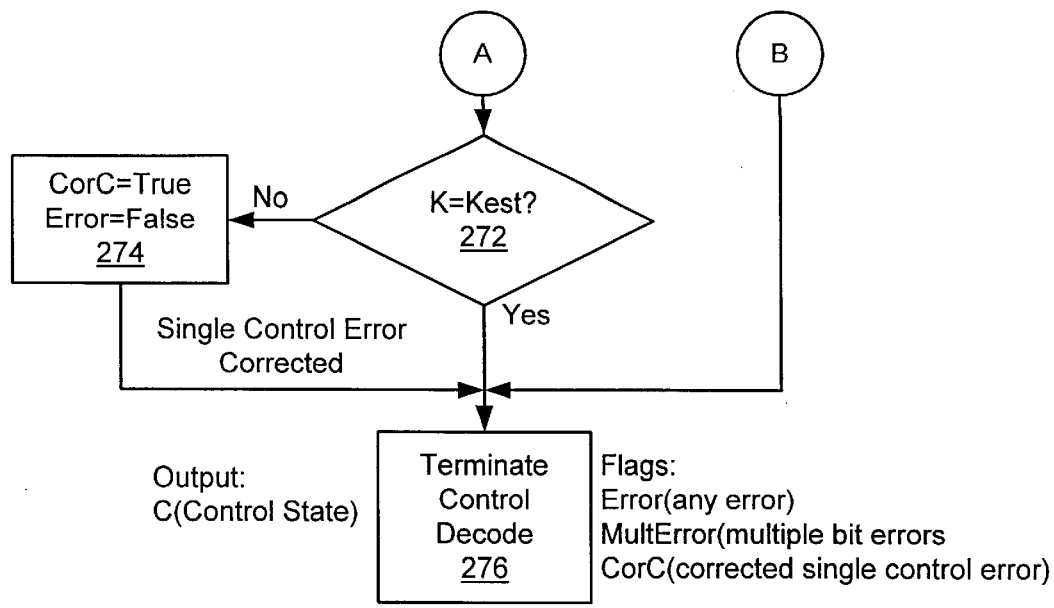

Control decoding can proceed once correct word and inter-channel alignment of the serially received data is achieved. The control portion of the cell is not scrambled and can be decoded without scrambler synchronization. The redundant nature of the control coding allows for correction of any single bit error or detection of double bit errors in the control bits of the cell (R0 and R1 in RXCI<18> and RXCI<19> respectively). A block diagram depicting exemplary Control ECC Decoder Logic 160 is shown in FIG. 10. The method used to decode the control word is shown in FIGS. 11a and 11b. The R0 and R1 bits (RXCI<19:18>) are decoded in K word estimation logic 220 to give an estimate of K in accordance with the equations set forth below.

$$\hat{K}_0 = !(R0_a + R0_d + R1_d) = !(RX<18>_a + RX<18>_d + RX<19>_d)$$

$$\hat{K}_1 = !(R0_b + R0_a + R1_a) = !(RX<18>_b + RX<18>_a + RX<19>_a)$$

$$\hat{K}_2 = !(R0_c + R0_b 30\ R1_b) = !(RX<18>_c + RX<18>_b + RX<19>_b)$$

$$\hat{K}_3 = !(R0_d + R0_c + R1_c) = !(RX<18>_d + RX<18>_c + RX<19>_c)$$

The estimated value of K is then checked and corrected, if required, in K word correction logic 222. Correction is possible because the control information in K can be recovered from only two channels and the channel parity checks indicate which channel is in error. The dependence of the K value to the channel is clear from the equations above.

$$\hat{K}_0 = F(A,D)$$

$$\hat{K}_1 = F(A,B)$$

$$\hat{K}_2 = F(B,C)$$

$$\hat{K}_3 = F(C,D)$$

Where F(x) indicates the output is a function of x. The coding of K is such that the correct value of K can be regenerated with the loss of any one channel. The Control State, C<1:0>, is decoded from the corrected K value in K word decode logic 224 and status flags are generated in status flag generation logic 226. In particular, the status flag generator asserts an error signal in the event a single bit error is detected, asserts a MultError signal in the event a multi-bit error is detected and asserts a CorC signal in the event a single bit error in the control field C<1:0> has been detected and corrected.

The flow diagram of FIGS. 11a and 11b illustrates the operation of the control ECC decoder depicted in FIG. 10 and discussed above. Estimated values of K bits are calculated as described above and as illustrated in step 250. Inquiry is made whether any parity errors were detected in the respective channels as shown in inquiry steps 252 and 254.

If a single parity error is detected in channel A as indicated by a CE<a:d> value of 1000, the correct value of K is calculated based on the R0 values contained in channels 2 and 3 as indicated in step 256. If a single parity error is detected in channel B as indicated by a CE<a:d> value of 0100, as indicated in step 258, the correct value of K is calculated based on the R0 values contained in channels 0 and 4. If a single parity error is detected in channel C as indicated by a CE<a:d> value of 0010, as indicated in step 260, the correct value of K is calculated based on the R0 values contained in channels 0 and 1. If a single parity error is detected in channel D as indicated by a CE<a:d> value of 0001, as indicated in step 262, the correct value of K is calculated based on the R0 values contained in channels 1 and 2. A variable Error is then set to equal true, as depicted in step 266 to indicate that a single channel error has been detected. If as a result of inquiry step 254 it is determined that CE<a:d> indicates errors in two or more channels, control passes to step 278.

A determination is, next made whether there is an error in K in inquiry step 268. If there is no error in K, the control bits C<1:0> are decoded as a function of K as illustrated in step 270. Inquiry is then made whether the value of K equals the value of K estimated as depicted in step 272. If K=K estimated, no control error was detected and control decoding is terminated as illustrated in step 276. If K does not equal k estimated, control passes to step 274. In step 274 an indication is recorded that a single bit control error has been detected and corrected. Following step 274, control decoding is terminated as indicated in step 276.

If it is determined in step 268 that there is an error in K, control passes to step 278 and an indication of an error and the fact that the error involves a multi-channel error is recorded. The C values are then set to a default condition as illustrated in step 280 since the multiple errors cannot be corrected. Following step 280 control passes to step 276 and control decoding is terminated.

Receiver De-scrambler

The De-scrambler 158 uses the same side scrambler structure as the transmitter with the added complexity of having to acquire current scrambler state. Each channel has a separate de-scrambler 158a, 158b, 158c and 158d (see FIG. 7). A more detailed block diagram depicting an exemplary structure of the de-scramblers 158a, 158b, 158c and 158d is shown FIG. 12. The receive logic can detect when an Idle cell is being transmitted with the decoded Control State data appearing on control lines C<1:0> . This will occur frequently during the Inter Packet Gap (IPG) of a normal Ethernet transmission. Presence of Idle cells can be guaranteed by use of the well known Far End Fault protocol given in the Ethernet standard. The Idle state is defined to have 0x0000 in the 16 least significant bits of the data payload in each channel. The Idle is scrambled in each channel but if the data field is zeros then RXCI<14:0> is the scrambler state (seed) in each channel. The scrambler seed is recovered and loaded into the receiver scramblers. The sequence can be completely recovered in one idle period because the sequence length is 15 and the complete state is defined in each channel's data payload. The Monitor bit and its effect on the error correction terms do not effect the bits used for scrambler seed acquisition and are not restricted during idle transmission. The scrambler state can be recovered in each channel separately or the receiver can use the property that all channels have synchronized scrambler states which are offset from each other by a known amount.

A state machine controls the scrambler state acquisition and verifies that the scrambler remains in lock during Idle cells. Scrambler states between channels can also be optionally checked. The data ECC, which follows the scrambler, also provides an indication of loss of scrambler sync by recording a high number of multiple errors.

Figure 12:
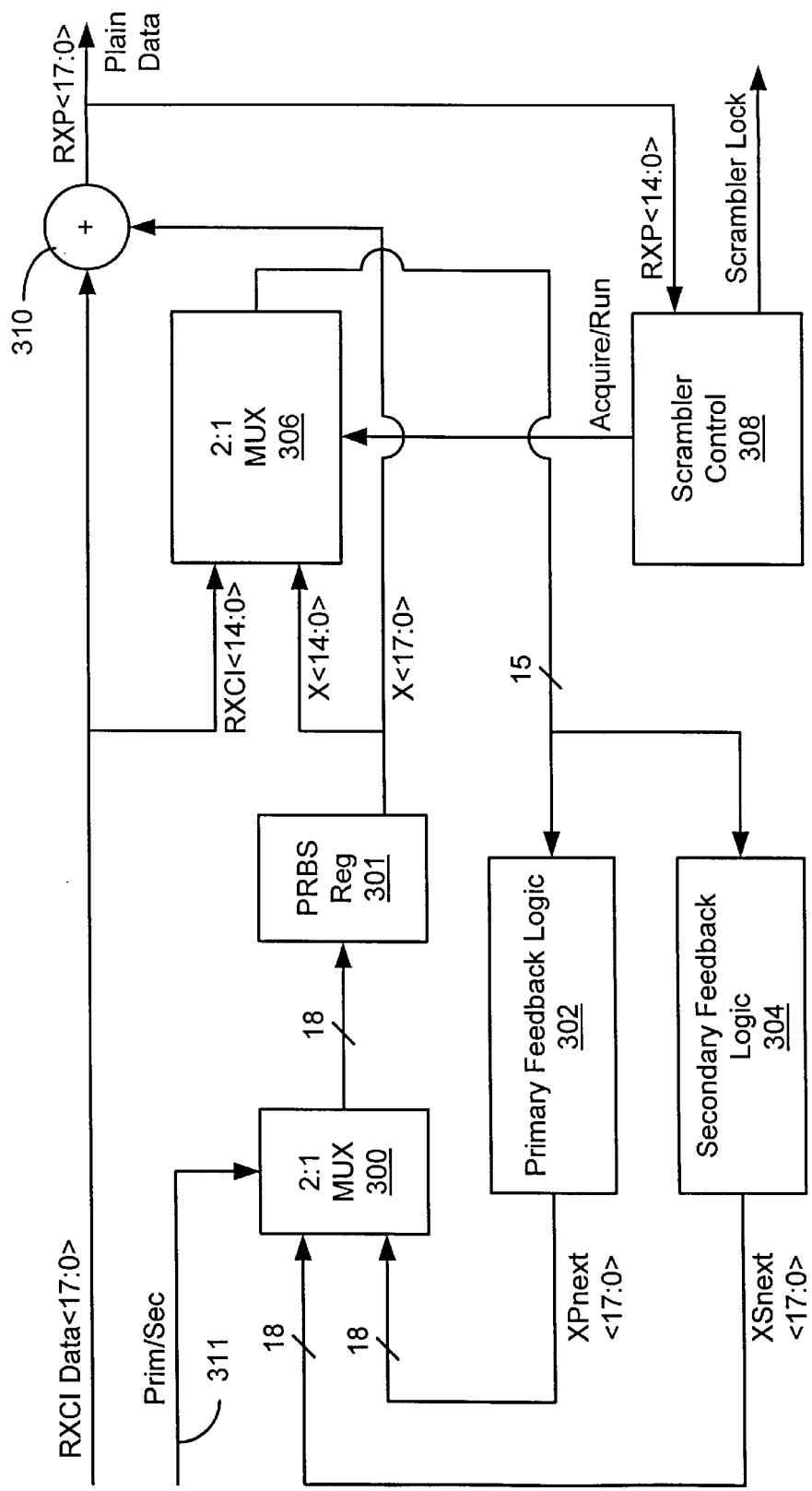
FIGS. 12 is a block diagram illustrating descrambler logic within the receive portion of the physical coding sublayer logic.

Referring to FIG. 12, scrambler control logic 308 decodes control signals C<1:0> to determine when an idle character is being transmitted. In response to detection of an idle, an acquire signal is conveyed to the 2:1 MUX 306 to acquire the seed for the respective channel.

De-scrambler Implementation

An exemplary side-stream de-scrambler implementation is depicted in FIG. 12. Each of the de-scramblers 158a, 158b, 158c, 158d (See FIG. 7) employs the logic depicted in FIG. 12 in a preferred embodiment. 2:1 MUX 300 has an output bus that is coupled to pseudo random binary sequence (PRBS) register 301. The output of PRBS register 301 is coupled to one input of 2:1 MUX 306. Received cipher data from bus RXCI_Data<17:0> is coupled to the second input of 2:1 one MUX 306. The MUX 306 is controlled by Scrambler Control 308. The MUX 306 is set to accept cipher data from bus RXCI_Data<17:0> during acquisition or set to accept the output of PRBS register 301 X<14:0> during normal receive operation. The output of the MUX 306 is coupled to the inputs of primary feedback logic 302 and secondary feedback logic 304. The outputs of the primary and secondary feedback logic are fed back to the inputs of the two to one MUX 300. Either the primary or secondary feedback logic outputs are selected as the operative input to the two to one MUX 300 in response to a primary/secondary selection control signal 311. Exclusive OR logic 310 receives as inputs received cipher data from bus RXCI_Data<17:0> and the PRBS register 301 outputs X<17:0>. The signals on RXCI_Data<17:0> and X<17:0> are exclusive ORed by exclusive OR logic 310 to produce plain data RXP<17:0> at each of the respective De-Scrambler outputs; e.g. RXPa<17:0>, RXPb<17:0>, RXPc<17:0> and RXPd<17:0>.

The feedback equations for the primary sequence are the same as for the Transmit Scrambler 54 (See FIG. 3) and are shown below.

$XPnext0=X3+X4;$ $XPnext1=X4+X5;$ $XPnext2=X5+X6;$ $XPnext3=X6+X7;$ $XPnext4=X7+X8;$ $XPnext5=X8+X9;$ $XPnext6=X9+X10;$ $XPnext7=X10+X11;$ $XPnext8=X11+X12;$ $XPnext9=X12+X13;$ $XPnext10=X13+X14;$ $XPnext11=X0+X1+X14;$ $XPnext12=X0+X2;$ $XPnext13=X1+X3;$ $XPnext14=X2+X4;$ $XPnext15=X3+X5;$ $XPnext16=X4+X6;$ $XPnext17=X5+X7;$ Similarly, the feedback equations for the secondary sequence are the same as for the Transmit Scrambler 54 (See FIG. 3) and are shown below.

$XSnext0=X3+X7;$ $XSnext1=X4+X8;$ $XSnext2=X5+X9;$ $XSnext3=X6+X10;$ $XSnext4=X7+X11;$ $XSnext5=X8+X12;$ $XSnext6=X9+X13;$ $XSnext7=X10+X14;$ $XSnext8=X0+X4+X11;$ $XSnext9=X1+X5+X12;$ $XSnext10=X2+X6+X13;$ $XSnext11=X3+X7+X14;$ $XSnext12=X0+X8;$ $XSnext13=X1+X9;$ $XSnext14=X2+X10;$ $XSnext15=X3+X11;$ $XSnext16=X4+X12;$ $XSnext17=X5+X13;$ The outputs of the respective de-scramblers provide plain data that are identified as RXPa<17:0>, RXPb<17:0>, RXPc<17:0> and RXPd<17:0> as indicated above. The de-scrambler output buses are coupled to the inputs of the Receive Interleaver and Data ECC Decoder 162 which is shown in FIG. 7 and depicted with greater particularity in FIG. 13.

Receive Interleave and Data ECC Decoder

Figure 13:
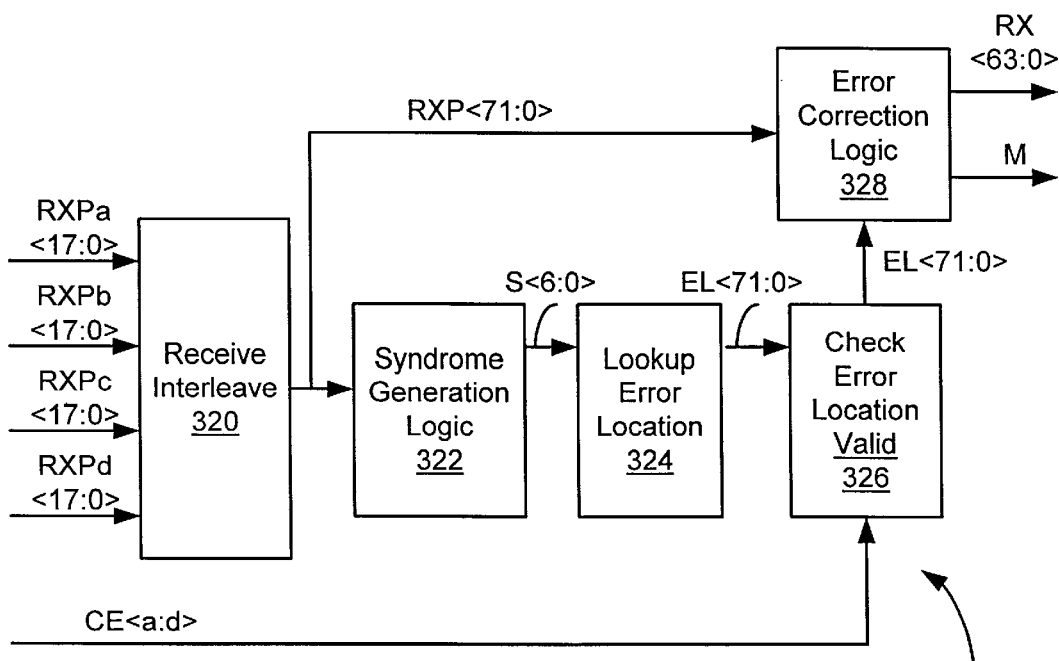
FIG. 13 is a block diagram illustrating the data error correction code (ECC) decoder logic employed within the receive portion of the physical coding sublayer logic.

The Receive Interleave and Data ECC Decoder 162 (See FIG. 7) recovers the data from each of the channels and performs the Data ECC Decoder function. An exemplary block diagram of a Receive Interleave and Data ECC Decoder is depicted in FIG. 13. The receive interleave 320 (See FIG. 13) is performed in accordance with the following equations to reproduce the original data ordering in the input to the transmit interleaver 53 (See FIGS. 3 and 4). The interleave function may simply comprise recombination of the RXP<17:0> plain data to form the original data word, the ECC bits E<6:0> and the monitor bit M.

$RXP<71:0>=<RXPd17, RXPd16,$ $RXPc17, RXPc16, RXPb17, RXPb16,$ $RXPa17, RXPa16, RXPd15 \ldots RXPd0,$ $RXPc15 \ldots RXPc0, RXPb15 \ldots RXPb0,$ $RXPa15 \ldots RXPa0>$ Receive Data ECC Decoder The Receive Data ECC Decoder 162 (See FIG. 7) is illustrated in greater detail in FIG. 13. The receive data ECC decoder uses the redundant E<6:0> bits in the physical coding sublayer cell payload contained with the respective RXP channels RXPa, RXPb, RXPc and RXPd to detect and correct errors in the data payload. The data from each channel are combined using the receive interleave logic 320. The syndrome S<6:0> is calculated in the syndrome generator 322 over the 72-bit payload using the syndrome generation equations set forth below.

$S0=RXP2+RXP5+RXP9 +$ $RXP10+RXP11+RXP16+RXP18 +$ $RXP19+RXP20+RXP21+RXP22 +$ $RXP25+RXP27+RXP29+RXP30 +$ $RXP31+RXP34+RXP35+RXP37 +$ $RXP41+RXP44+RXP45+RXP46 +$ $RXP47+RXP51+RXP53+RXP58 +$ $RXP59+RXP65;$ $S1=RXP0+RXP3+RXP6 +$ $RXP10+RXP11+RXP12+RXP17 +$ $RXP19+RXP20+RXP21+RXP22 +$ $RXP23+RXP26+RXP28+RXP30 +$ $RXP31+RXP32+RXP35+RXP36 +$ $RXP38+RXP42+RXP45+RXP46 +$ $RXP47+RXP48+RXP52+RXP54 +$ $RXP59+RXP60+RXP66;$ $S2=RXP0+RXP1+RXP4 +$ $RXP7+RXP11+RXP12+RXP13+RXP18 +$ $RXP20+RXP21+RXP22+RXP23+RXP24 +$ $RXP27+RXP29 +$ $RXP31+RXP32+RXP33+RXP36 +$ $RXP37+RXP39+RXP43+RXP46 +$ $RXP47+RXP48+RXP49+RXP53 +$ $RXP55+RXP60+RXP61+RXP67;$ $S3=RXP1+RXP2+RXP5 +$ $RXP8+RXP12+RXP13+RXP14 +RXP19 +$ $RXP21+RXP22+RXP23+RXP24 +$ $RXP25+RXP28+RXP30+$ $RXP32+RXP33+RXP34+RXP37 +$ $RXP38+RXP40+RXP44+RXP47 +$ $RXP48+RXP49+RXP50+RXP54 +$ $RXP56+RXP61+RXP62+RXP68;$ $S4=RXP0+RXP2+RXP3 +$ $RXP6+RXP9+RXP13+RXP14 +$ $RXP15+RXP20+RXP22+RXP23 +$ $RXP24+RXP25+RXP26+RXP29 +$ $RXP48+RXP49+RXP50+RXP51 +$ $RXP55+RXP57+RXP62+$ $RXP63+RXP69;$ $S5=RXP0+RXP1+RXP3 +$ $RXP4+RXP7+RXP10+RXP14 +$ $RXP15+RXP16+RXP21+RXP23 +$ $RXP24+RXP25+RXP26+RXP27 +$ $RXP30+RXP32+RXP34+RXP35 +$ $RXP36+RXP39+RXP40+RXP42 +$ $RXP46+RXP49+RXP50+RXP51 +$

RXP52+RXP56+RXP58+RXP63 +

RXP64+RXP70;

S6=RXP1+RXP4+RXP8 +

RXP9+RXP10+RXP15+RXP17+RXP18 +

RXP19+RXP20+RXP21+RXP24+

RXP26+RXP28+RXP29+

RXP30+RXP33+RXP34+RXP36 +

RXP40+RXP43+RXP44+RXP45 +

RXP46+RXP50+RXP52+RXP57 +

RXP58+RXP64+RXP71;

Any value for the generated syndrome other than zero indicates the presence of an error. All single bit errors will yield a unique syndrome value, which indicates the location of the error within the 72-bit field. The error location is determined in Lookup logic 324 using the illustrative lookup table shown in Table 9 below. The error is then cross-checked against the channel parity flags using error check logic 326 and corrected, if possible using error correction logic 328. The 64-bit data message and monitor bits are then extracted and coupled to the XGMII receive controller 164.

TABLE 9

Syndrome to Error Location

| Syndrome Value | | | Error Location | | |
|---|---|---|---|---|---|
| S<6:0> | S (hex) | S (dec) | (hex) | (dec) | Channel |
| 0000000 | 00 | 0 | No Error | No Error | 0000 |
| 0000001 | 01 | 1 | 41 | 65 | 1000 |
| 0000010 | 02 | 2 | 42 | 66 | 0100 |
| 0000011 | 03 | 3 | 3B | 59 | 0001 |
| 0000100 | 04 | 4 | 43 | 67 | 0100 |
| 0000101 | 05 | 5 | 35 | 53 | 0001 |
| 0000110 | 06 | 6 | 3C | 60 | 0001 |
| 0000111 | 07 | 7 | 0B | 11 | 1000 |
| 0001000 | 08 | 8 | 44 | 68 | 0010 |
| 0001001 | 09 | 9 | 05 | 5 | 1000 |
| 0001010 | 0A | 10 | 36 | 54 | 0001 |
| 0001011 | 0B | 11 | N/A | Mult Error | 1111 |
| 0001100 | 0C | 12 | 3D | 61 | 0001 |
| 0001101 | 0D | 13 | 25 | 37 | 0010 |
| 0001110 | 0E | 14 | 0C | 12 | 1000 |
| 0001111 | 0F | 15 | 2F | 47 | 0010 |
| 0010000 | 10 | 16 | 45 | 69 | 0010 |
| 0010001 | 11 | 17 | 29 | 41 | 0010 |
| 0010010 | 12 | 18 | 06 | 6 | 1000 |
| 0010011 | 13 | 19 | N/A | Mult Error | 1111 |
| 0010100 | 14 | 20 | 37 | 55 | 0001 |
| 0010101 | 15 | 21 | N/A | Mult Error | 1111 |
| 0010110 | 16 | 22 | N/A | Mult Error | 1111 |
| 0011001 | 19 | 25 | 02 | 2 | 1000 |
| 0011010 | 1A | 26 | 26 | 38 | 0010 |
| 0011011 | 1B | 27 | N/A | Mult Error | 1111 |
| 0011100 | 1C | 28 | 0D | 13 | 1000 |
| 0011101 | 1D | 29 | N/A | Mult Error | 1111 |
| 0011110 | 1E | 30 | 30 | 48 | 0001 |
| 0011111 | 1F | 31 | 16 | 22 | 0100 |
| 0100000 | 20 | 32 | 46 | 70 | 0001 |
| 0100001 | 21 | 33 | 10 | 16 | 0100 |
| 0100010 | 22 | 34 | 2A | 42 | 0010 |
| 0100011 | 23 | 35 | N/A | Mult Error | 1111 |
| 0100100 | 24 | 36 | 07 | 7 | 1000 |
| 0100101 | 25 | 37 | 1B | 27 | 0100 |
| 0100110 | 26 | 38 | N/A | Mult Error | 1111 |
| 0100111 | 27 | 39 | N/A | Mult Error | 1111 |
| 0101000 | 28 | 40 | 38 | 56 | 0001 |

TABLE 9-continued

Syndrome to Error Location

| Syndrome Value | | | Error Location | | |
|---|---|---|---|---|---|
| S<6:0> | S (hex) | S (dec) | (hex) | (dec) | Channel |
| 0101001 | 29 | 41 | N/A | Mult Error | 1111 |
| 0101010 | 2A | 42 | N/A | Mult Error | 1111 |
| 0101011 | 2B | 43 | N/A | Mult Error | 1111 |
| 0101100 | 2C | 44 | N/A | Mult Error | 1111 |
| 0101101 | 2D | 45 | N/A | Mult Error | 1111 |
| 0101110 | 2E | 46 | 20 | 32 | 0010 |
| 0101111 | 2F | 47 | N/A | Mult Error | 1111 |
| 0110000 | 30 | 48 | 3F | 63 | 0001 |
| 0110001 | 31 | 49 | 33 | 51 | 0001 |
| 0110010 | 32 | 50 | 03 | 3 | 1000 |
| 0110011 | 33 | 51 | 23 | 35 | 0010 |
| 0110100 | 34 | 52 | 27 | 39 | 0010 |
| 0110101 | 35 | 53 | N/A | Mult Error | 1111 |
| 0110110 | 36 | 54 | 00 | 0 | 1000 |
| 0110111 | 37 | 55 | N/A | Mult Error | 1111 |
| 0111000 | 38 | 56 | 0E | 14 | 1000 |
| 0111001 | 39 | 57 | 19 | 25 | 0100 |
| 0111010 | 3A | 58 | N/A | Mult Error | 1111 |
| 0111011 | 3B | 59 | N/A | Mult Error | 1111 |
| 0111100 | 3C | 60 | 31 | 49 | 0001 |
| 0111101 | 3D | 61 | N/A | Mult Error | 1111 |
| 0111110 | 3E | 62 | 17 | 23 | 0100 |
| 0111111 | 3F | 63 | N/A | Mult Error | 1111 |
| 1000000 | 40 | 64 | 47 | 71 | 0001 |
| 1000001 | 41 | 65 | N/A | Mult Error | 1111 |
| 1000010 | 42 | 66 | 11 | 17 | 0100 |
| 1000011 | 43 | 67 | N/A | Mult Error | 1111 |
| 1000100 | 44 | 68 | 2B | 43 | 0010 |
| 1000101 | 45 | 69 | 12 | 18 | 0100 |
| 1000110 | 46 | 70 | N/A | Mult Error | 1111 |
| 1000111 | 47 | 71 | N/A | Mult Error | 1111 |
| 1001100 | 4C | 76 | N/A | Mult Error | 1111 |
| 1001101 | 4D | 77 | N/A | Mult Error | 1111 |
| 1001110 | 4E | 78 | N/A | Mult Error | 1111 |
| 1001111 | 4F | 79 | N/A | Mult Error | 1111 |
| 1010000 | 50 | 80 | 39 | 57 | 0001 |
| 1010001 | 51 | 81 | 09 | 9 | 1000 |
| 1010010 | 52 | 82 | N/A | Mult Error | 1111 |
| 1010011 | 53 | 83 | 2D | 45 | 0010 |
| 1010100 | 54 | 84 | N/A | Mult Error | 1111 |
| 1010101 | 55 | 85 | 1D | 29 | 0100 |
| 1010110 | 56 | 86 | N/A | Mult Error | 1111 |
| 1010111 | 57 | 87 | 14 | 20 | 0100 |
| 1011000 | 58 | 88 | N/A | Mult Error | 1111 |
| 1011001 | 59 | 89 | N/A | Mult Error | 1111 |
| 1011010 | 5A | 90 | N/A | Mult Error | 1111 |
| 1011011 | 5B | 91 | N/A | Mult Error | 1111 |
| 1011100 | 5C | 92 | 21 | 33 | 0010 |
| 1011101 | 5D | 93 | N/A | Mult Error | 1111 |
| 1011110 | 5E | 94 | N/A | Mult Error | 1111 |
| 1011111 | 5F | 95 | N/A | Mult Error | 1111 |
| 1100000 | 60 | 96 | 40 | 64 | 1000 |
| 1100001 | 61 | 97 | 3A | 58 | 0001 |
| 1100010 | 62 | 98 | 34 | 52 | 0001 |
| 1100011 | 63 | 99 | 0A | 10 | 1000 |
| 1100100 | 64 | 100 | 04 | 4 | 1000 |
| 1100101 | 65 | 101 | N/A | Mult Error | 1111 |
| 1100110 | 66 | 102 | 24 | 36 | 0010 |
| 1100111 | 67 | 103 | 2E | 46 | 0010 |
| 1101000 | 68 | 104 | 28 | 40 | 0010 |
| 1101001 | 69 | 105 | N/A | Mult Error | 1111 |
| 1101010 | 6A | 106 | N/A | Mult Error | 1111 |
| 1101011 | 6B | 107 | 1E | 30 | 0100 |
| 1101100 | 6C | 108 | 01 | 1 | 1000 |
| 1101101 | 6D | 109 | N/A | Mult Error | 1111 |
| 1101110 | 6E | 110 | N/A | Mult Error | 1111 |
| 1101111 | 6F | 111 | 15 | 21 | 0100 |
| 1110000 | 70 | 112 | 0F | 15 | 1000 |
| 1110001 | 71 | 113 | N/A | Mult Error | 1111 |
| 1110010 | 72 | 114 | 1A | 26 | 0100 |
| 1110011 | 73 | 115 | N/A | Mult Error | 1111 |
| 1110100 | 74 | 116 | N/A | Mult Error | 1111 |
| 1110101 | 75 | 117 | N/A | Mult Error | 1111 |

TABLE 9-continued

Syndrome to Error Location

| Syndrome Value | | | Error Location | | |
|---|---|---|---|---|---|
| S<6:0> | S (hex) | S (dec) | (hex) | (dec) | Channel |
| 1110110 | 76 | 118 | N/A | Mult Error | 1111 |
| 1110111 | 77 | 119 | N/A | Mult Error | 1111 |
| 1111000 | 78 | 120 | 32 | 50 | 0001 |
| 1111001 | 79 | 121 | 22 | 34 | 0010 |
| 1111010 | 7A | 122 | N/A | Mult Error | 1111 |
| 1111011 | 7B | 123 | N/A | Mult Error | 1111 |
| 1111100 | 7C | 124 | 18 | 24 | 0100 |
| 1111101 | 7D | 125 | N/A | Mult Error | 1111 |
| 1111110 | 7E | 126 | N/A | Mult Error | 1111 |
| 1111111 | 7F | 127 | N/A | Mult Error | 1111 |

Multiple errors are checked using several methods that guarantee detection of all two-bit errors. The R1 channel parity bits are used to cross check the location of a single bit error. Absence of a parity error with a non-zero syndrome indicates a multiple bit error. A syndrome that does not map to a valid error location indicates a multiple bit error.

Figure 14A:
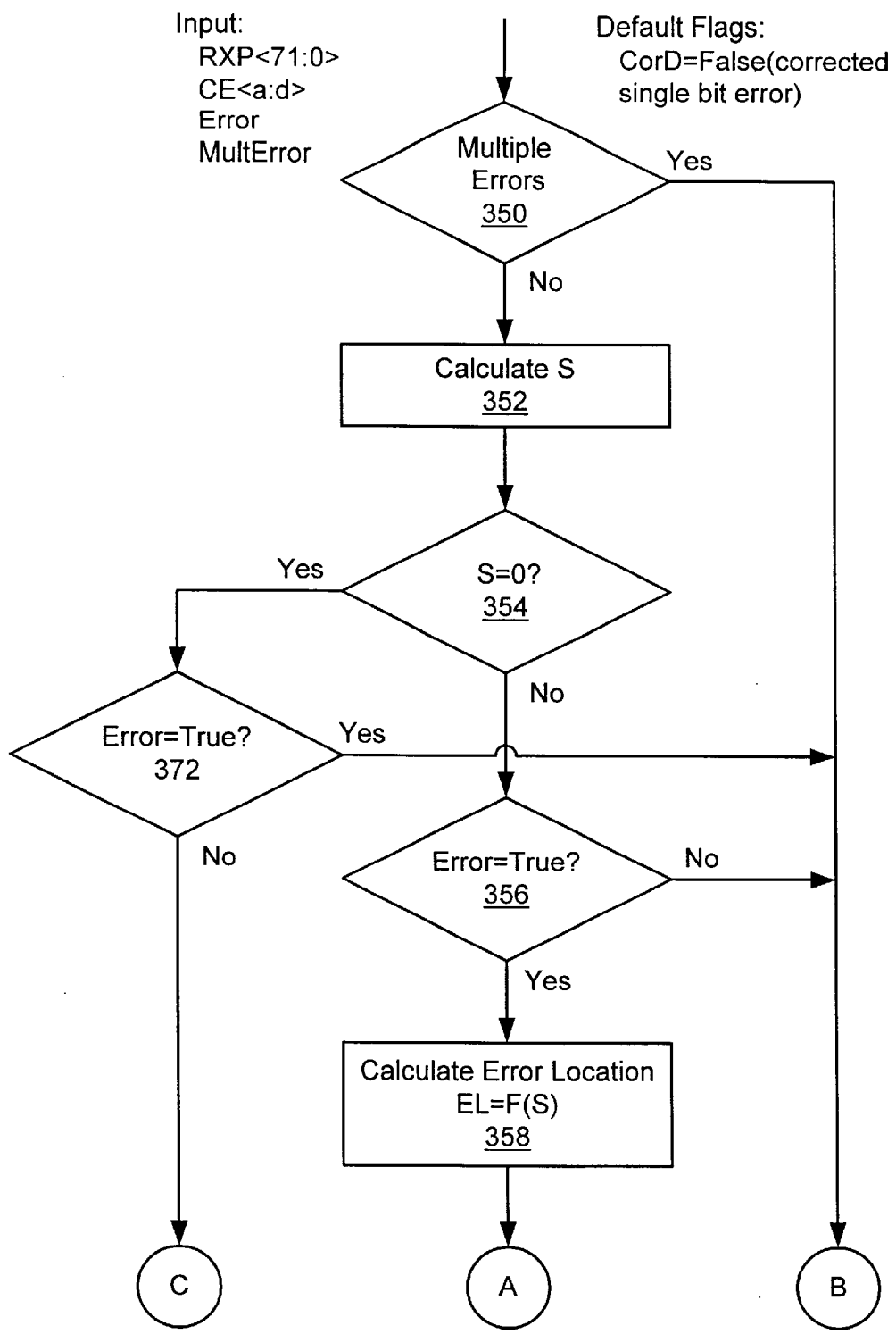
FIGS. 14a and 14b are a flow diagram depicting an exemplary method of operation of the data ECC decoder within the receive portion of the physical coding sublayer logic.
Figure 14B:
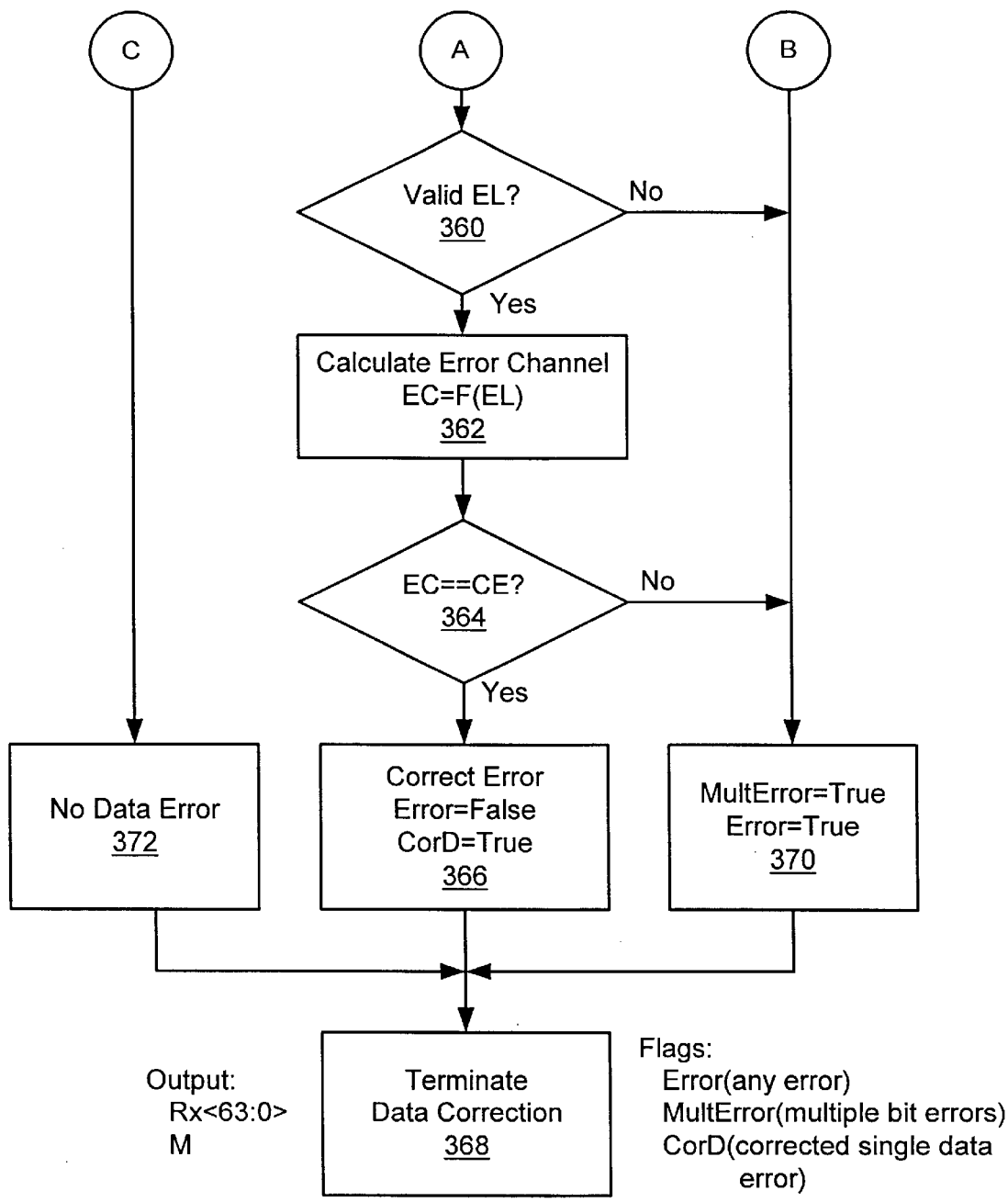

The method of operation of the data error correction code decoder is further illustrated in the flow chart depicted in FIGS. 14a and 14b.

The Data ECC Decoder first checks if multiple errors have been detected by the Control ECC Decoder 160 (See FIG. 7) using the Multiple Errors inquiry step 350 (See FIG. 14a). This is determined by examining the MultError input flag. If multiple errors are detected in inquiry step 350 the Data ECC Decoder does not attempt decoding and terminates though step 370 setting the MultError and Error status flags and through step 368. If no multiple errors were detected by inquiry step 350 the Data ECC Decoder calculates the syndrome in step 352. The syndrome value is checked in inquiry step 354. If the syndrome value is zero in inquiry step 354 the Data ECC Decoder checks if the Error flag is set in inquiry step 372. The Error flag indicates an error was detected in any channel by checking the parity. If an error was detected in inquiry step 372 the Data ECC Decoder terminates through step 370 setting the MultError and Error status flags and through step 368 because it is not possible to get a zero syndrome value and a channel error without having multiple errors. If the Error flag is not set in inquiry step 372, then the Data ECC Decoder terminates through the No Data Error step 372 and through step 368 because no error was detected and no correction is required. If the syndrome value checked in inquiry step 354 is non-zero then the syndrome detected an error. The Data ECC Decoder then checks if the Error flag in inquiry step 356 has detected an error in any channel parity. If the Error flag is not set in inquiry step 356 the Data ECC Decoder terminates through step 370 setting the MultError and Error status flags and through step 368 because it is not possible to get a non-zero syndrome value and no channel error without having multiple errors. If the Error flag detected an error in inquiry step 356 then the Data ECC Decoder proceeds to calculate the error location in step 358 because the syndrome and Error flags are both consistent in detecting an error. The Calculate Error Location step 358 calculates the error location from the syndrome value which is then checked by the Valid Error Location inquiry step 360. If the error location is not valid in inquiry step 360, i.e., it does not correspond to any of the 72 received bits in RXP<71:0>, the Data ECC Decoder terminates though step 370 setting the MultError and Error status flags and through step 368 because it is not possible to have a bad error location without having multiple errors. If the error location is validated by inquiry step 360 the Data ECC Decoder calculates which channel the error occurred in using the Calculate Error Channel step 362. The error channel is calculated from the error location and the known mapping of error location to transmitted channel. The error channel (EC) determined by step 362 is then checked against the channel error (CE) determined by the parity checks in each channel using inquiry step 364. If the two error channel indicators do not match in inquiry step 364 the Data ECC Decoder terminates through step 370 setting the MultError and Error status flags and through step 368 because it is not possible to get inconsistent channel errors without having multiple errors. If the channel error indicators match in inquiry step 364 the Data ECC Decoder corrects the single bit error in step 366. The bit value at the calculated error location is flipped. The Data ECC Decoder then sets the error flag to false indicating an error is no longer present and sets the corrected data (CorD) flag indicating a single bit error has been corrected in the data field. The Data ECC Decoder then terminates through step 368.

XGMTT Receive Controller

The XGMII receive control logic 164 (See FIG. 7) translates the receive state and data into XGMII format for delivery to the MAC 11 within the system interface 10 (See FIG. 1). Mapping into the XGMII format is straightforward. Any uncorrected physical coding sublayer cell error received during a packet will generate corresponding symbol error(s) on the equivalent bytes on the XGMII. Cell errors received during idle will typically be discarded. In the event the XGMII interface requires cell errors to be identified to the MAC as a false carrier event, they should be so indicated.

Receiver Monitors and Statistics

The Receive State Sync Controller (See FIG. 7) assures that synchronization of the received signal is obtained in the correct sequence and monitor the errors within the channel to declare the link down when the error rate reaches an unsustainable level. Synchronization is first achieved within each channel (Word Lock), then inter-channel alignment (Cell Lock), and then scrambler synchronization (Sync Lock). Any loss of synchronization by the lower process will automatically cause loss of the higher level synchronization states. The status of each of the receive blocks is indicated by flags and are collectively shown as RxFlags (See FIG. 7). Word Lock indicates if word synchronization has been achieved in each channel. Cell Lock indicates that the complete physical coding sublayer cell is correctly aligned across all channels. Sync Lock in each channel indicates that the scramblers have acquired their correct states.

After acquisition, the receive logic goes into a track mode where errors are detected and counted. Parity errors within each channel are indicated by the channel error variable, CE<a:d>. The corrected control flag, CorC, indicates single control errors. Single data field errors are indicated by the corrected data flag, CorD. Multiple bit errors are indicated by the MultError flag, which can be generated either by the Control FEC Decoder or the Data FEC Decoder. MultError generates symbol error(s) on the receiver XGMII if they occur in a data frame.

The two single bit error flags (corrected control, CorC and corrected data, CorD) should be summed. A channel error mask (CE<a:d>) is used to keep separate counters on single bit errors per channel.

Multiple bit errors (100% of two-bit errors, lower probability of detection with higher bit errors) are accumulated in a separate counter. The error location of multiple bit errors is not guaranteed using physical coding sublayer encoding so only a single counter is employed in a preferred embodiment.

It will be apparent to those of ordinary skill in the art that modifications to and variations of the above described methods and apparatus may be made without departing from the inventive concepts disclosed herein. Accordingly, the invention should not be viewed as limited except as by the scope and spirit of the appended claims.

What is claimed is:

1. A method for communicating information comprising the steps of:

receiving a first parallel data word of a first width within a first information channel;

receiving at least one bit constituting information within a second information channel independent of said first information channel;

generating an error correction code based upon said received first parallel data word and said at least one bit;

segregating said received first parallel word, said received at least one bit, and said error correction code into a plurality of lesser width parallel data words;

scrambling each of said plurality of lesser width parallel data words with respective de-correlated side scramblers to produce a corresponding plurality of cipher data words;

serializing each of said plurality of cipher data words; and transmitting each of said plurality of serialized cipher data words over a respective one of a plurality of serial data channels.

2. The method of claim 1 wherein said first width comprises 64 bits.

3. The method of claim 1 wherein each of said plurality of lesser width parallel data words comprises an 18 bit parallel data word.

4. A method for obtaining synchronization in a multi-channel data communication system comprising the steps of:

obtaining a parallel data word and a plurality of control bits defining a control word;

encoding said control bits to form an encoded control word comprising a plurality of bits, said encoded control word containing control state redundantly and having predetermined parity;

selectively dividing said parallel data word to form a plurality of lesser width parallel data words;

scrambling each of said lesser width parallel data words to form a corresponding plurality of cipher data words;

generating a plurality of first parity bits corresponding in number to said plurality of cipher data words, each of said parity bits being generated as a function of a corresponding one of said cipher data words and at least one selected bit of said encoded control word;

selectively associating each of said first parity bits with a corresponding one of said lesser width parallel data words, wherein each respective first parity bit is associated with a cipher data word that was not employed to generate the respective first parity bit;

generating a plurality of second parity bits corresponding in number to said plurality of cipher data words, wherein each of said second parity bits is generated as a function of a selected one of said cipher data words and the first parity bit associated with the respective cipher data word;

associating each of said plurality of second parity bits with the corresponding cipher data word used to generate the respective second parity bit;

serializing each of the plurality of cipher data words and the associated first and second parity bits to form an extended cipher data word and transmitting the respective extended cipher data words over a corresponding serial data channel for receipt by a receiver;

deserializing the serialized extended cipher data words received over each of said serial data channels;

for each channel, generating a receive parity indicator for each of a plurality of received data words as defined by an initial word framing, each word being the size of an extended cipher data word;

for each channel, in the event the receive parity indicator does not equal a first predetermined value for each of a predetermined number of the received data words, adjusting the word framing for the channel such that the receive parity indicator is subsequently generated for different received data words, the adjusting being repeated until the receive parity indicator equals the first predetermined value;

for each channel, in the event the receive parity indicator in the respective channel equals the first predetermined value for each of a predetermined number of received data words, generating an indication of correct word framing for the respective channel;

in response to detection of said indication of correct word framing in each of said plurality of channels, determining the sum of said plurality of second parity bits over a set of cipher data words received from the channels as defined by an initial inter-channel alignment;

in the event the sum of said plurality of second parity bits does not equal a second predetermined value at the initial inter-channel alignment, adjusting inter-channel alignment of the words in the respective channels such that the sum of the second parity bits is subsequently determined for different sets of cipher data words, the adjusting being repeated until the sum of said plurality of second parity bits equals said second predetermined value; and in response to a determination that the sum of said plurality of second parity bits equals said second predetermined value for each of a second predetermined number of successive sets of cipher data words for a given inter-channel alignment, generating an indication that correct inter-channel alignment has been achieved.

5. The method of claim 4 further including the steps of:

recovering said encoded control word from said first and second parity bits;

determining whether a single bit error is present in said recovered encoded control word; and correcting said single bit error in response to a determination that said single bit error has occurred utilizing selected information contained within said first and second parity bits.

6. The method of claim 4 wherein said step of determining whether a single bit error has occurred includes the step utilizing said second parity bits to determine the channel in which the single bit error has occurred.

7. Apparatus for transmitting data within first and second information channels over a plurality of serial communication channels comprising:

interface logic for receiving a series of first parallel data words of a first width within said first information channel and a second word of a second width within said second information channel, wherein said second width comprises at least one bit;

error correction code generation logic operative to receive said first parallel data word of said first width and said second word of said second width and to generate an error correction code in response thereto;

said first parallel data word, said second word and said error correction code being segregated into a plurality of lesser width parallel data words;

a plurality of scramblers corresponding in number to said plurality of lesser width data words, wherein each of said plurality of lesser width parallel data words is coupled to a corresponding one of said scramblers, said scramblers being operative to generate at respective scrambler outputs a corresponding plurality of cipher data words that are decorrelated in time;

a plurality of serialization logic circuits corresponding in number to said number of scramblers, each of said plurality of serialization logic circuits being operative to receive a corresponding one of said plurality of cipher data words and to convert the respective cipher data word from a parallel cipher data word to a serial cipher data word; and transmit logic operative to transmit said plurality of serial cipher data words over said plurality of serial communication channels.

8. The apparatus of claim 7 wherein said second word is contained within one of said lesser width parallel data words, and wherein said transmit logic is operative to transmit said first word over said plurality of serial communication links and is operative to transmit said second word over one of said plurality of serial communication links.

9. The apparatus of claim 8 wherein said second word has a width of one bit.

10. Physical coding sublayer logic for transmitting data and control information over a plurality of serial links, comprising:

interface logic for receiving a series of first parallel data words of a first width within a first information channel, a control word, and a second word of a second width within a second information channel, wherein said second width comprises at least one bit;

control state generation logic for generating an encoded control word from said received control word, wherein said encoded control word has a predetermined parity, defines transmit control states within said physical coding sublayer logic, and contains said control state redundantly in a plurality of encoded control word bits;

error correction code generation logic operative to generate an error correction code in response to the input of said first parallel data word and said second word;

selected bits of said first parallel data word, said second word and said error correction code being segregated into a plurality of lesser width parallel data words;

a plurality of scramblers each operative to receive a corresponding one of said plurality of lesser width parallel data words and to generate a corresponding cipher data word;

parity code generation logic operative to generate a plurality of first and second parity bits and to selectively associate said first and second parity bits with a selected one of said cipher data words, each of said first parity bits being generated as a function of a corresponding one of said cipher data words and a selected bit of said encoded control word, each of said first parity bits being associated with a selected cipher data word that was not employed in the generation of the respective bit;

each of said second parity bits being generated as a function of a corresponding selected cipher data word and the first parity bit associated with the respective cipher data word;

each said cipher data word and said associated first and second parity bits forming respective extended cipher data words;

serialization logic for converting said extended cipher data words into serial extended cipher data words; and transmit logic for transmitting said serial extended cipher data words over a plurality of serial communication links.

11. The physical coding sublayer logic of claim 10 further including:

deserialization logic for receiving said serial extended cipher data words from respective ones of said serial communication channels and generating parallel received words in corresponding receive channels, the parallel received words corresponding in width to the width of said extended cipher data words;

word framing logic in each receive channel operative: (1) to generate an indication that the received word in the respective receive channel is properly framed in the event the parity across the received words equals a predetermined framing parity value over a predetermined number of received words, (2) to adjust the word framing in the event that the framing parity value across the received words does not equal said predetermined value over all said predetermined number of received words, the adjusting being repeated until correct word framing in the respective channel is achieved, and (3) to generate an indication of full word framing once correct word framing has been achieved in all of said plurality of receive channels; and inter-channel alignment logic operative: (1) in response to detection of said full word framing indicator, to adjust the inter-channel alignment of the respective receive channels until the sum of said second parity bits equals a predetermined alignment parity value over a predetermined number of sets of received words, and (2) to provide an indication of correct inter-channel alignment in response to the determination that the sum of the second parity bits has equaled said predetermined alignment parity value over said predetermined number of sets of received words.

12. The physical coding sublayer logic of claim 11 wherein said predetermined framing parity value equals 1 and said predetermined alignment parity value equals 0.

13. The physical coding sublayer logic of claim 11 further including control word estimation logic for generating an estimated value of said encoded control word based upon the values of selected ones of said first and second parity bits.

14. The physical coding sublayer logic of claim 13 wherein said logic is further operative to verify the estimated value of said encoded control word and to correct said estimated value of said control word in the event an error is detected in a single one of said plurality of receive channels.

* * * * *

UNITED STATES PATENT AND TRADEMARK OFFICE
CERTIFICATE OF CORRECTION

PATENT NO. : 6,738,935 B1
DATED : May 18, 2004
INVENTOR(S) : Myles Kimmitt

It is certified that error appears in the above-identified patent and that said Letters Patent is hereby corrected as shown below:

Column 2,
Line 25, "data data" should read -- data --;

Column 6,
Line 58, "XRMTT" should read -- XGMII --;

Column 7,
Line 33, "nsfers" should read -- transfers --;

Column 15,
Line 17, "$R0_a$)" should read -- $R0_b$) --;
Line 25, insert -- ! indicates inversion --;

Column 20,
Line 13, "$R0_b30$" should read -- $R0_b+$ --;

Column 24,
Between lines 50 and 52, insert the following:
-- RXP31+RXP33+RXP34+
RXP35+RXP38+RXP39+
RXP41+RXP45 --; and Column 28,
Line 23, "XGMTT" should read -- XGMII --.

Signed and Sealed this

Third Day of January, 2006

JON W. DUDAS
*Director of the United States Patent and Trademark Office*